U̇nited States Patent Office 3,634,478
Patented Jan. 11, 1972

3,634,478
N-(CYANOALKYL)-NITROPHENYLENE DIAMINES
Alexander Halasz, Norwalk, Conn., Milos S. Bil, Forest Hills, N.Y., and Walter H. Brunner, Easton, Pa., assignors to Clairol Incorporated, New York, N.Y.
No Drawing. Original application May 24, 1965, Ser. No. 458,443. Divided and this application Sept. 18, 1969, Ser. No. 859,192
Int. Cl. C07c *121/78*
U.S. Cl. 260—465 E        14 Claims

ABSTRACT OF THE DISCLOSURE

Compounds having the following formula, these being particularly useful as hair dyes:

$$\underset{R_1}{\overset{R_2}{\diagdown}}N-\underset{NO_2}{\overset{H}{\underset{|}{\bigcirc}}}-\overset{H}{\underset{|}{N}}(CH_2)_nCN$$

wherein $R_1$ and $R_2$ are hydrogen, alkyl or hydroxyalkyl and $n$ is a whole number from 1 to 4.

---

This application is a division application of Ser. No. 458,443, filed May 24, 1965.

This invention relates to a novel group of alkyl derivatives of nitroaminobenzenes that are particularly suitable as dye intermediates or for dyeing keratinaceous materials. More particularly, it relates to said derivatives and compositions containing the same which may be used to dye living human hair on the head or as dye intermediates in preparing such dyes.

A variety of nitrophenylenediamine derivatives have been suggested for use in the prior art as hair dyes. These, however, have been found in practice to offer many disadvantages. Nitrophenylenediamine dyes having no substituents on the amino nitrogens have only a yellow or orange shade. This is a disadvantage, since it is the red, blue and violet shades that are necessary for blending colors to arrive at natural looking shades.

The simple alkyl-substituted nitrophenylenediamine derivatives wherein only the simple alkyl substituents (e.g., methyl, ethyl) are on one or both amino nitrogens are insufficiently soluble or dispersible in water. Moreover, some dyes of this class tend to sublime readily when exposed to heat (e.g., body heat or sunlight). The dyeing with these dyes, thus, become weaker and off-shade on wearing.

It has also been suggested to employ, as hair dyes, compounds of the type discussed above which have ionizable substituents on the alkyl group bonded to the amino nitrogen. Substituted alkly groups of this type include —CH₂CO₂H, —(CH₂)ₙSO₃H and —CH₂CH₂NR₃Cl. However, dyes having the —CH₂COOH or

—(CH₂)ₙSO₃H groups have generally low affinity to hair under the mild conditions required. Dyes having the —CH₂—CH₂NR₃⁺Cl⁻ group may have good affinity for hair but tend to dye unlevel, to be rubbed off readily and to stain the skin.

It has further been suggested to introduce such side chains as —CH₂CH₂OH,

—CH₂CH₂—O—CH₂CH₂—OH and —CH₂CH₂NH₂ and —CH₂CONH₂ into the nitrophenylenediamine dyes as a chief group determining the characteristics of the dye. These groups tend to unduly raise the hydrophilic character of the dye when too many of them are present, resulting in poor dyeing. This is due to the fact that the dye would tend to stay in the dye bath rather than go onto the hair. Moreover, dyes having the aminoalkyl radical are high in basicity which makes the dye more soluble in acid media and less likely to go onto the hair from such media.

It has now been found that the disadvantages of the prior art dyes noted above are avoided through the use of an alkyl derivative of nitrophenylenediamines, defined in more detail below. Moreover, it has also been found that these may be readily prepared from certain alkyl derivatives of nitroaminobenzenes, also defined below.

It is accordingly an object of the present invention to provide a group of novel compounds that are suitable for use in dyeing keratinaceous material, and particularly human hair.

It is another object of the present invention to provide a dye intermediate suitable for synthesizing a dye that may be employed in dyeing keratinaceous material, and particularly human hair.

It is a further object of the present invention to provide a composition suitable for dyeing keratinaceous material, and particularly living human hair, which incorporates therein one or more of said novel compounds.

It is still a further object of the present invention to provide a method for dyeing keratinaceous materials, and particularly living human hair which utilizes said composition mentioned in the above objects.

It is still another object of the present invention to provide novel alkyl derivatives of nitrophenylenediamines which avoid the disadvantages of similar type compounds known in the prior art and mentioned above when used in dyeing human hair.

Other and more detailed objects will be apparent from the following description and claims.

The above objects of the present invention are obtained by means of compounds of the following formula and particularly hair substantive dyes of this formula:

(I)
$$\underset{Z}{\overset{NHR_1}{\bigcirc}}-Y$$

wherein Y and Z are selected from the group consisting of —NO₂ and —NR₂R₃, at least one of said Y and Z being —NO₂, and wherein R₁, R₂ and R₃ are selected from the group consisting of hydrogen, alkyl, hydroxyalkyl and the radical -alkylene-X, at least one of said R₁, R₂ and R₃ being the radical -alkylene-X, in which the divalent radical -alkylene- may be straight chain or branched chain and may contain up to 4 carbon atoms; and X is selected from the group —O-alkyl, —NH—CO-alkyl, —NH—CO-hydroxyalkyl,
—NHCO₂-aryl, —NHSO₂-alkyl
—NHSO₂-aryl, —NHCONH₂

—NHCO-alkyl, —NHCSNH₂, —C—alkyl,
        ‖                        ‖
        O                        O —CN, —SO₂NH₂, —SO₂NH-alkyl,
    —SO₂NH-hydroxyalkyl, —SO₂N-alkyl, —SO₂N-alkyl, —SO₂N-hydroxyalkyl
      |              |                |
     alkyl      hydroxyalkyl    hydroxyalkyl and —SO₂-alkyl; the alkyl and hydroxalkyl portions of these groups containing 1 to 6 carbon atoms, and preferably 1 to 3 carbon atoms.

In the compounds of Formula I in which both Y and Z are —NO₂, the above definition provides that R₁ is -alkylene-X. Although these have some use as dyes, they are principally useful as intermediates in preparing alkyl derivatives of nitrophenylenediamines. On the other hand, compounds of Formula I which are especially suitable as dyes are those compounds in which one of Y and Z is —$NO_2$ and the other is —$NR_2R_3$, wherein $R_2$ and $R_3$ have the same significance ascribed to them above.

When $R_1$, $R_2$ or $R_3$ in Formula I above is an alkyl radical, it may be of any carbon-chain length and may be either straight chain or branched chain. As a practical matter, however, the alkyl radical will rarely exceed 8 carbon atoms. In the preferred form of the invention, the alkyl radicals are lower alkyl radicals, and particularly alkyl radicals having from 1 to 4 carbon atoms. By way of example, the following specific alkyl radicals may be mentioned: methyl, ethyl, propyl, isopropyl, n-butyl, sec.-butyl, tert.-butyl, n-amyl, n-hexyl, and 2-ethylhexyl.

Similarly, when $R_1$, $R_2$ or $R_3$ of Formula I are hydroxyalkyl radicals, the alkyl moiety of these radicals may be of any carbon-chain length and likewise may be either straight chain or branched chain. Again, however, as a practical matter, they will rarely exceed 8 carbon atoms, and preferably they will be lower alkyl groups containing from 1 to 4 carbon atoms.

Moreover, the number of hydroxy groups that will be contained in said hydroxyalkyl radicals will also vary. For the most part, there will be a maximum of 3 hydroxy groups.

The following list exemplifies the hydroxyalkyl groups which are included within the definition of $R_1$, $R_2$ and $R_3$ of Formula I above: hydroxymethyl, 2-hydroxyethyl, 3-hydroxypropyl, 2,3-dihydroxypropyl and 4-hydroxybutyl. The aryl group may be unsubstituted or may contain any of a variety of substituents. Typical of the substituents that can be mentioned are lower alkyl, halogen, hydroxyalkyl, lower alkoxy, nitro, dialkylamino, carbamoyl, sulfamoyl, etc.

Where the aryl radical is a substituted phenyl radical, the substituents may occupy any position in the benzene nucleus. When the aryl radical is a naphthyl radical, the substituents may occupy any of the $\alpha$ or $\beta$ positions. In the preferred form of the invention, this aryl radical is a hydrocarbon radical, and more particularly a phenyl radical or a lower alkyl substituted phenyl radical.

By way of illustrating the compounds of this invention of the type in which at least one of said $R_1$, $R_2$ and $R_3$ is the radical -alkylene-NHCO-aryl or alkylene-$NHSO_2$-aryl, the following examples of aryl may be mentioned: phenyl, o-, m-, p-tolyl, m-chlorophenyl, m- and p-anisyl, p-ethoxyphenyl, m-hydroxymethylphenyl, m-nitrophenyl, p-dimethylaminophenyl, m-carbamoylmethyl, m-sulfamoylmethyl, 1-naphthyl, 2 - naphthyl, 3 - hydroxy-2-naphthyl, 8-methoxy-1-naphthyl.

The compounds of the present invention may be prepared by various known methods which depend on the nature and position of the substituent -alkylene-X in Formula I.

In the case where $R_1$ has the value -alkylene-X in Formula I, these compounds are generally prepared by first reacting 2,4-dinitrochlorobenzene with a suitable amine, $NH_2$-alkylene-X. This is accomplished by heating one mole of the former with one or more moles of the latter, in alcohol, aqueous alcohol, or an organic solvent containing an acid binder, such as sodium bicarbonate, sodium acetate, calcium carbonate or an additional mole of the amine, at reflux for periods ranging from ½ hour to 6 hours. This gives an N-substituted 2,4-dinitroaniline (Formula A below).

In the next step one of the nitro groups is preferentially reduced to give either a 2-nitro-p-phenylenediamine or a 4-nitro-o-phenylenediamine, depending on the reduction method used. In the former case the reduction is carried out essentially by the method of U.S. Pat. 3,088,978, namely by catalytic hydrogenation in an organic solvent in the presence of mineral acid; the acid salt of the substituted 2-nitro-p-phenylenediamine (Formula B below) precipitates out of the reaction mixture, and the free base is recovered therefrom by basification. In order to obtain a 4-nitro-o-phenylenediamine, one can reduce the dinitroaniline (Formula A below) by means of a slight excess of sodium polysulfide in aqueous alcoholic medium by heating at about 80° C. for about 10 to 15 minutes; the product (Formula C below) precipitates out.

From the substituted nitrophenylenediamines described above, one can proceed to further variations of Formula I in which $R_2$ and $R_3$ are alkyl or hydroxyalkyl groups by reaction with the appropriate alkyl or hydroxyalkyl halide, sulfate or tosylate or an alkylene oxide, for example, with ethyl iodide, dimethyl sulfate, methyl tosylate, ethylene chlorohydrin or ethylene oxide, by known methods. Either one or two alkyl or hydroxyalkyl groups may be introduced by varying the proportion of the reagent used, the course of the reaction being conveniently followed by chromatogram, and stopped when the appropriate degree of substitution has been reached. Similarly, $R_2$ and $R_3$ may be different alkyl or hydroxyalkyl groups, which are introduced sequentially by reaction first with $R_2$-hal and then with $R_3$-hal (hal being a halogen atom or its equivalent sulfate or tosylate group).

When in the general Formula I, it is desired that $R_2$ and/or $R_3$ be the substituted -alkylene-X, the dye may be conveniently prepared from a 2-nitro-p-phenylenediamine or a 4-nitro-o-phenylenediamine (e.g. Formula D below) in which $R_1$ is already present. This is reacted with an appropriate X-alkylene-hal, in which hal represents a chlorine, bromine or iodine atom. Depending on the reactivity of the X-alkylene-hal and the number of X-alkylene groups to be introduced (whether one or two), one uses varying proportions of the reagent, from one mole to a large excess.

The reaction is carried out in an organic solvent or aqueous organic solvent at temperatures varying from room temperature to about 175° C., and for times varying from 1 to 20 hours. The solvent, temperature and time of reaction selected depend in part on the activity of the X-alkylene-hal used. For example, highly reactive X-alkylene-hal compounds, such as chloroacetonitrile, are reacted at low temperatures, in a low boiling solvent, such as ethanol, for short times, say 1 to 2 hours. The X-alkylene-hal compounds of low activity, such as chloroethyl ethyl ether, are reacted in a high boiling solvent, such as amyl alcohol, at reflux temperature for at least 8 hours.

In any case, the extent of reaction is preferably followed by chromatogram in which can be seen the proportion of unreacted, monosubstituted and disubstituted components, which can be distinguished by their colors. The reaction is stopped at the desired stage, and the mixture worked up as usual. Significant amounts of unreacted starting material may be removed as the Schiff's base with benzaldehyde.

An alternate method for introducing -alkylene-X groups is to react a nitrophenylenediamine (e.g., Formula D below) with a compound having an activated double bond. In this case the -X moiety generally is an electron attracting group which serves to activate the double bond. Examples of reactants of this character include acrylonitrile, vinyl methyl ketone, and methyl vinyl sulfone. The reaction is carried out by using equimolecular amounts of the two materials, in alcohol or aqueous alcohol containing a small amount of acetic acid as catalyst and heating at reflux for 3 to 10 hours. By this means only one -alkylene-X will generally be introduced. For the introduction of two such groups, a large excess of the unsaturated reactant may be used, serving also as the solvent. After one group -alkylene-X has been introduced, it is possible to introduce a different alkyl, hydroxyalkyl or -alkylene-X group by reaction with the appropriate reagent, e.g., $R_3$-hal where hal is a halogen atom or an equivalent sulfate or tosylate group.

The following diagrams will illustrate the sequence of reactions described above:

(a) When $R_1$ of Formula I is -alkylene-X:

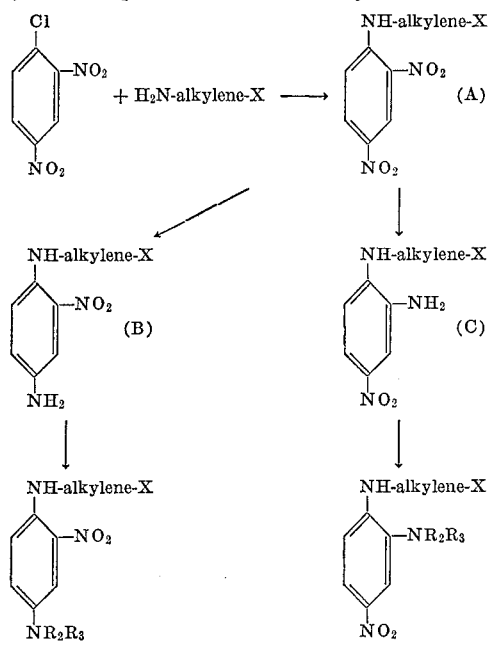

(b) When $R_2$ and/or $R_3$ of Formula I is -alkylene-X:

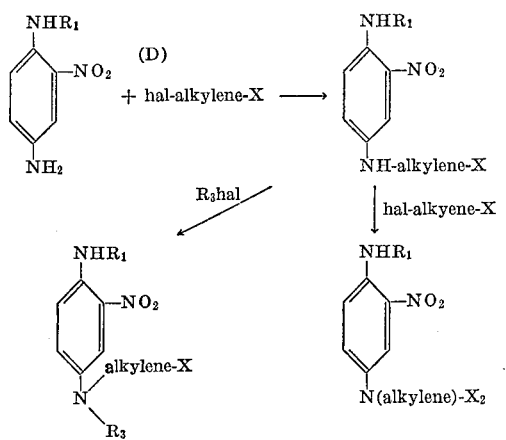

(c) When activated double bond reactant is employed:

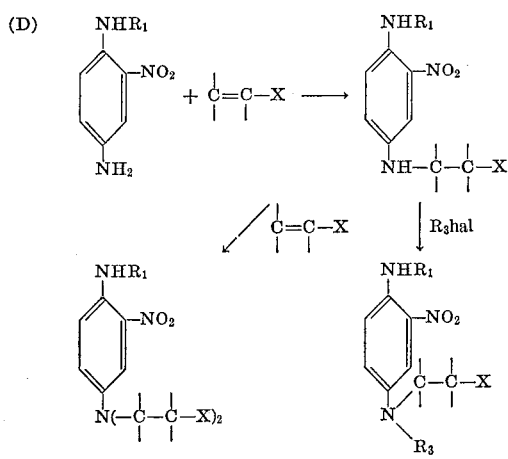

While the above procedures are generally useful for the preparation of the dyes of this invention, certain alternate routes may be suitable in specific cases. Thus, when -X is acylamido, one may first prepare an N-aminoalkyl derivative of a nitrophenylenediamine, and subsequently acylate the free aliphatic amino group by means of an acid anhydride, acid chloride, alkanesulfonyl chloride, arylsulfonyl chloride, or chloroformic ester using known methods. Or, by reacting 2,4-dinitrochlorobenzene with a diaminoalkane, one can obtain an N-aminoalkyl-2,4-dinitroaniline, which may be acylated and one of the nitro groups reduced and so forth, as described above.

When X is a ureido group, $-NHCONH_2$, one may again prepare the aminoalkyl derivatives mentioned above, and either react them with potassium cyanate in a solvent or fuse them with urea for conversion of the free amino group to the ureido. For introducing the thioureido group, $-NHCSHN_2$, one may react the aminoalkyl derivatives with carbon disulfide and caustic to form the dithiocarbonate; this is converted to the isothiocyanate (e.g., by reaction with ethyl chloroformate), and this in turn reacted with dry ammonia.

In the case where X is a sulfamoyl or a substituted sulfamoyl group, it is convenient to first react 2,4-dinitrochlorobenzene with an aminoalkanesulfonic acid (such as taurine), thereby obtaining an N-sulfoalkyl-2,4-dinitroaniline. This may be converted by known methods, as with $PCl_5$, to the N-chlorosulfonylalkyl-2,4-dinitroaniline which by reaction with ammonia, an alkylamine or a hydroxyalkylamine forms the corresponding sulfamoylalkyl derivative of 2,4-dinitroaniline.

The dyes embodied in the present invention have many advantages over the prior art dyes utilized in this field. As compared with nitrophenylenediamine dyes having no substituents on the nitrogens, which are yellow or orange in shade, the dyes of this invention show a wide range of shade, from yellow to bluish violet.

As compared with the dyes having only unsubstituted alkyl groups on the nitrogen (such as simple methyl, ethyl), the dyes of this invention are more soluble in water, or more readily dispersible. They can thus given more concentrated dye baths and therefore much stronger dyeings on hair. Also, as previously mentioned, the dyes of this character wherein only H or unsubstituted alkyl groups are bonded to nitrogen tend to sublime readily, when exposed to heat (e.g., body heat or sunlight) and thus to become weaker and off-shade on wearing. In contrast, the dyes of this invention are non-subliming.

As compared to dyes having ionizable substituents on the alkyl group, i.e. where the radical on the nitrogen is $-CH_2COOH$, $-(CH_2)_nSO_3H$, or $-CH_2CH_2NR_3{}^+Cl^-$, for example, which ionize in water to give the radicals $-CH_2CO_2{}^-$, $-(CH_{2n}SO_3{}^-$, or $-CH_2CH_2NR_3{}^+$, respectively, the dyes of this invention have much higher affinity to hair without at the same time dyeing the hair unlevely, rubbing off, or staining the skin.

With regard to prior art dyes having non-ionic substituted alkyl radicals, such as $-CH_2CH_2OH$, $-CH_2CH_2OCH_2CH_2OH$ $-CH_2CH_2NH_2$ and $-CH_2CONH_2$, the advantages of the present dyes vary. For example, an acylated aminoalkyl side chain, such as $-CH_2CH_2NHCOR$ or $-CH_2CH_2CH_2-NHSO_2R$ would be superior to the known free aminoalkyl side chain, $-CH_2CH_2NH_2$ of the prior art in affording higher affinity to hair and better wet fastness, including shampoo fastness. The situation is similar for an alkoxyalkyl group, $-(CH_2)_nOR$, of the present invention, as compared to the known hydroxyalkyl group, $-CH_2CH_2OH$, or the known hydroxyalkoxyalkyl group, $-CH_2CH_2OCH_2CH_2OH$ This is because dye affinity and wet fastness depend on having an optimum of hydrophilic character. Thus, too low a hydrophilicity (unsubstituted alkyl) gives low solubility and poor dyeing, but too high a hydrophilicity also gives poor dyeing, since the dye then tends to remain in the dye bath rather than going on the hair. A free hydroxy or amino group has more hydrophilic character than alkoxy or acylamido and could in fact be too hydrophilic for the purpose of dyeing hair.

A further disadvantage of the aminoalkyl radical is its high basicity which makes the dye more soluble in acidic media and less likely to go on hair therefrom. This disadvantage is removed in the case of all of the present acrylamido derivatives, i.e., alkyl substituted by NHCOR, NHCOAr, NHSO$_2$R, NHCONH$_2$, NHCO$_2$R, NHCSNH$_2$.

Another comparison may be made directly between the known sulfonic acid dyes (having (CH$_2$)$_n$SO$_3$H) and the present sulfonamide dyes (having SO$_2$NH$_2$, SO$_2$NHR, or SO$_2$NRR'). As discussed above, the sulfonic dyes are anionic, with low general affinity when compared to the sulfonamides of this invention.

The dyes of the present invention can be employed to prepare basic, neutral or acidic dye compositions and because of their stability, may be used in conjunction with oxidation dyes. Furthermore, they may likewise be included in hair dyeing compositions which contain other direct dyeing dyes that also may or may not contain an oxidation dye. A variety of direct dyeing dyes are known in the prior art which are useful for this purpose. They include other nitro dyes, azo dyes, anthraquinone dyes, etc. By way of illustration, any of the nitro dyes disclosed in the following U.S. patents may be used in conjunction with the present nitro dyes: 2,750,326; 2,750,327; 3,088,877; 3,088,878 and 3,088,978.

The dye compositions of this invention have in general the advantage that they are stable on storage. For example, when they are stored in the dark at 50° C. for a period of 3 months and then dyed on hair by methods described below, they show essentially no change in shade or strength of dyeing, as compared to the same compositions applied initially, before storage. Stability on storage is of great commercial importance, since dye compositions on the market are likely to be held on the shelf for periods up to several years, sometimes at high ambient temperatures.

The pH of the dye compositions of this invention can vary from about 2.5 to 11. In the acid range the pH of about 3.5 to 6 is suitable. It is preferred, however, that the compositions be in the alkaline range, and particularly at a pH of about 7.5 to 10. Any selected water-dispersible, compatible, alkalizing agent (if it is desired to have the compositions in the alkaline range) can be used to give the desired pH. The quantity of the alkalizing agent employed can vary over a wide range depending on the dye and particular alkalizing agent employed and the desired pH. Illustratively, the alkalizing agent can vary from less than about 0.1% to about 10%, and preferably from about 0.25% to about 5% by weight of the composition.

The alkalizing agent is selected so that it will not interfere (i.e., is compatible) with the dye employed, and will not precipitate the dye or introduce any possibility of toxicity under the conditions of use, or injure the scalp at its ultimate concentration in the composition to be applied to the keratinaceous material. A preliminary test of some selected alkalizing agent can be made to note its compatibility with the dye or to discover possibility of toxicity or injury.

Ammonium hydroxide, because of its freedom from toxicity over a wide concentration range and its economy, is an acceptable alkalizing agent. However, there can be used in place of, or together with, ammonia any other compatible ammonia derivative as an alkalizing agent, such as an alkylamine, such as ethylamine, dipropylamine, or triethylamine, an alkanediamine, such as 1,3-diaminopropane, an alkanolamine, such as ethanolamine or diethanolamine, a polyalkylenepolyamine, such as diethylenetriamine, or a heterocyclic amine, such as morpholine.

Also, as alkalizing agent, any alkaline earth hydroxide, for example, calcium hydroxide or magnesium hydroxide, can be used up to the limit of its water solubility and at any concentration that fails to produce a precipitate with any of the components of the composition. The dissolved alkaline earth hydroxides are preferred over the alkali metal hydroxides, such as sodium hydroxide or potassium hydroxide, or carbonates, such as sodium carbonate and bicarbonate, any of which can also be used so long as their ultimate concentration in the final dyeing solution is below that which might possibly irritate the scalp.

The alkalizing component of choice, however, is a water-soluble organic amine of low volatility (B.P. higher than about 50° C.) having less than about 12 carbon atoms, such as n-propylamine, isobutylamine, 2-ethylbutylamine, diethylamine, dimethylamine, triethylamine. Particularly suited as the alkalizing agent are the following: (A) primary aliphatic diamines, such as ethylenediamine; 1,2-diaminopropane; 1,3-diaminopropane; diethylenetriamine; triethylenetetramine; 2,2'-iminodipropylamine; 3,3'-iminodipropylamine; and bis-hexamethylenetriamine; (B) alkanolamines, such as ethanolamine; isopropanolamine; diethanolamine; di-isopropanolamine; triethanolamine; triisopropanolamine; N-methyldiethanolamine; diisopropylethanolamine; dimethylisopropanolamine; 2-amino-2-methylpropane-1,3-diol; tris(hydroxymethyl)methylamine and the like, which may also have a phenyl substituent, e.g., N-(2-hydroxyethyl)aniline; N-methyl-N-(2-hydroxyethyl)aniline; N,N-bis(2-hydroxyethyl)aniline; and (C) heterocyclic amines, such as morpholine, N-methylmorpholine, N-ethylmorpholine, N-hydroxyethylmorpholine, N-phenylmorpholine, piperidine, N-hydroxyethylpiperidine, and piperazine.

The pH of the composition may be adjusted with any inorganic or organic acid or acid salt which is compatible with the composition and will not introduce toxicity under its conditions of use, especially when acid compositions are desired. Illustrative of acids or acid salts there can be mentioned: sulfuric, formic, acetic, lactic, citric or tartaric acid, or ammonium sulfate, sodium dihydrogen phosphate, or potassium bisulfate.

Water-soluble surface active agents can also be employed in the dyeing compositions utilized in this invention. These can be anionic, non-ionic or cationic. Illustrative of the various types of water-soluble surface active agents there can be mentioned: higher alkylbenzenesulfonates; alkylnaphthalenesulfonates; sulfonated esters of alcohols and polybasic acids; taurates; fatty alcohol sulfates; sulfates of branched chain or secondary alcohols; alkyl dimethylbenzyl ammonium chlorides; and the like. Illustrative of specific surfactants there can be mentioned: lauryl sulfate; polyoxyethylene lauryl ester; myristyl sulfate; glyceryl monostearate; sodium salt of palmitic methyl taurine; cetyl pyridinium chloride; lauryl sulfonate; myristyl sulfonate; lauric diethanolamide; polyoxyethylene stearate; stearyl dimethyl benzyl ammonium chloride; dodecyl benzene sodium sulfonate; nonyl naphthalene sodium sulfonate; dioctyl sodium sulfosuccinate; sodium N-methyl-N-oleoyl taurate; oleic acid ester of sodium isothionate; sodium dodecyl sulfate; the sodium salt of 3,9-diethyl tridecanol-6-sulfate and the like. The quantity of water-soluble surface active agent can vary over a wide range, such as that of from about 0.25% to 15% and preferably from about 0.25% to 10% by weight of the composition.

A thickening agent can also be incorporated in the present dyeing composition which may be one or several of those commonly used in hair dyeing, such as sodium alginate or gum arabic, or cellulose derivatives, such as methylcellulose, or the sodium salt of carboxymethylcellulose, or acrylic polymers, such as polyacrylic acid sodium salt, or inorganic thickeners, such as bentonite. The quantity of thickening agent can vary over a wide range, such as that of from about 0.1% to 20% and preferably from about 0.5% to 5% by weight.

Tinctorially effective quantities of the novel nitro dyes in the compositions of this invention can also vary over a wide range, such as that of about 0.01% to greater than about 5%, e.g., 10%, by weight of the composition, and preferably from about 0.01% to about 2% by weight.

The water content of the composition is ordinarily the major constituent and can vary over a wide range dependent in large measure on the quantity of other additives. Thus, the water content can be as little as 10%, and preferably from about 70% to 99%.

The dyeing compositions of this invention are preferably aqueous compositions. The term "aqueous composition" is used herein in its usual generic sense as embracing any water-containing composition embodied in the invention. This includes true solutions of the dye in an aqueous medium, either alone or in conjunction with other materials, which are also dissolved or dispersed in the aqueous medium. The term "aqueous composition" also encompasses any mixture of dye with the aqueous medium either alone, or together with other ingredients. The dye may be colloidally dispersed in the medium or may merely be intimately mixed therein.

The term "aqueous medium" as used herein, includes any medium which contains water. Thus, the aqueous medium may be an aqueous alkaline, aqueous neutral or aqueous acid medium. Moreover, the aqueous medium may comprise water and a solvent, e.g., ethanol. The latter may be employed as a common solvent to enhance the solution of the dye or some other organic material.

The aqueous compositions of this invention may take many forms. Thus, they may be thin or thick flowable liquids, pastes, gels, etc.

Typical dyeing compositions of the various classes described about are set forth below:

1.—ALKALINE COMPOSITIONS

| | General range | Preferred range |
|---|---|---|
| Dye (percent) | 0.01–5 | 0.01–2 |
| Surface active agent (percent) | 0.25–10 | 0.25–5 |
| Alkali (percent) | 0.1–10 | 0.25–5 |
| Thickening agent (percent) | 0.1–20 | 0.5–3 |
| Acid added to (pH) | 7–11 | 7.5–9.5 |
| Water to 100% | | |

Any of the dyes, surface active agents, alkalies, thickening agents, acids and combinations thereof set forth above may be used in the proportion specified in the table immediately above.

(2) ACID COMPOSITIONS

The acid compositions are similar to the above alkaline compositions, except that the alkali is omitted, and the acid is added to a pH of 2.5–7, preferred 3.5–6.5. The surfactant may be anionic, cationic or non-ionic or suitable mixtures of these, and any of these mentioned above may be used. The choice of thickener is somewhat more limited, to alkylcellulosics, such as methylcellulose and inorganics. In certain cases the surfactant, itself, acts as a thickener.

(3) OXIDATION DYE COMPOSITIONS

The novel nitro dyes utilized in this invention are generally compatible with oxidation dyes. Accordingly, they can be used in oxidation dye compositions. Suitable compositions contain 1–5% ammonia, 2–3% hydrogen peroxide or urea peroxide; 0.005% to 2% oxidation dye components; 0.001% to 3% Compound I as defined above, as well as surfactant, thickeners, etc. By way of illustration in this connection, the following oxidation dye components can be utilized in formulating this composition: o-phenylenediamine, m-phenylenediamine, p-phenylenediamine, p-toluenediamine, nitro-p-phenylenediamine, 4-nitro-o-phenylenediamine, p-aminodiphenylamine; 4,4'-diaminodiphenylamine; 4,6-dinitro-2-aminophenol; 4-nitro-2-aminophenol; 2,4-diaminoanisole, hydroquinone, resorcinol, p-aminophenol; 1,2,4-trihydroxybenzene; 1,2,4-triacetoxybenzene.

The dyeing compositions of this invention can be prepared by the conventional methods used in the hair dyeing art. Thus, they can be prepared by dissolving or suspending the dye in water in the desired concentration. Water miscible organic solvents can be employed to facilitate solution of the dye; in this event, the dye can be dissolved first in the solvent and then diluted with water.

The dispersion of the various ingredients can also be facilitated by heating the composition at temperatures varying from 40° C. to 110° C. either before dilution with water or afterwards.

The dyeing compositions of this invention can be applied to hair by the conventional techniques used in the art. Illustratively, when applied to living hair on the human head, the compositions can be applied to the hair with a brush, sponge, or other means of contact, such as dipping until the hair is properly saturated with the composition.

The reaction time or time of contact of the dyeing composition with the hair is not critical and can vary over a wide range used in the hair dyeing art, such as periods of about 5 minutes to about 2 hours, and preferably from about 15 minutes to about 60 minutes. The dyeing temperature can vary over wide limits as is conventional in the art. Thus, the dyeing temperature can vary from about room temperature, e.g., about 20° C. to above about 60° C., and preferably from about 20° C. to about 45° C.

The following examples are further illustrative of the present invention. It is to be understood, however, that the invention is not limited thereto.

EXAMPLE 1

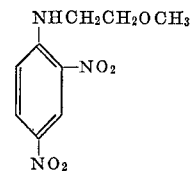

A solution of 37.5 g. 2-methoxyethylamine in 200 ml. water was heated to reflux, and 50 g. 2,4-dinitrochlorobenzene was slowly dropped in. This solution was then refluxed for an additional hour, and the mixture was cooled and filtered. The filter cake was then washed with water: Yield, 58.8 g. of a product having the above structural formula. This had a melting point of 143–7° C.

EXAMPLE 2

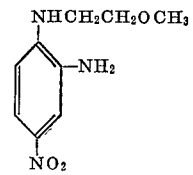

To a solution of 30 g. N-(2-methoxyethyl)-2,4-dinitroaniline in 500 ml. 50% isopropanol, maintained at a temperature of 70° C., was added 50 ml. of an aqueous solution containing 31.5 g. 60% sodium sulfide flakes and 8.2 g. sulfur. The resulting solution was stirred for one hour, then poured over ice. The product was then filtered off and washed. This synthesis gave a yield of 8.2 g. of yellow crystals of the product of the above formula which had a melting point of 101–6° C.

EXAMPLE 3

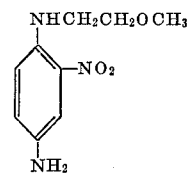

A mixture containing:

28 g. N-(2-methoxyethyl)-2,4-dinitroaniline
150 ml. isopropanol
40 g. 50% $H_2SO_4$
2 g. 5% platinum-on-charcoal was hydrogenated at atmospheric pressure until 3 molar equivalents of hydrogen were taken up. A precipitate was formed which was filtered off and treated with 600 ml. boiling water in order to dissolve the sulfate salt of the product. The hot slurry was filtered and the filtrate was cooled and made basic with ammonia. The product, which has the above structure, and which was in the form of reddish crystals, was filtered off. The yield was 3.3 g.

EXAMPLE 4

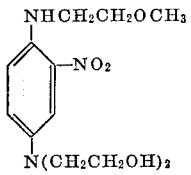

A mixture of:

13 g. N¹-(2-methoxyethyl)-2-nitro-p-phenylenediamine
50 ml. water
300 ml. isopropanol
200 ml. chloroethanol was heated at reflux. Over a period of two hours, 320 g. of 25% aqueous NaOH was dropped into the reaction mixture. The excess chloroethanol was steam-distilled off. The residue was then extracted with ethyl acetate. The solution was then concentrated and, on standing in the cold, there was obtained 9 g. of violet crystals having a melting point of 64–5° C. This product has the above structure.

EXAMPLE 5

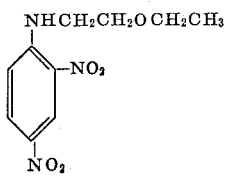

To a mixture of:

400 ml. isopropanol
30 g. Na₂CO₃
45 g. 2-ethoxyethylamine at reflux was added over a period of ½ hour 101 g. of 2,4-dinitrochlorobenzene. This mixture was heated for one hour, cooled and filtered. The product obtained was then washed with water. There was recovered 124 g. of the product of the above structure, having a melting point of 81–2° C.

EXAMPLE 6

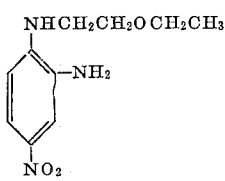

To a mixture of 30.7 g. N-(2-ethoxyethyl)-2,4-dinitroaniline and 175 ml. isopropanol heated at 70–80° C., there was added, while stirring and over a period of one hour, a solution of 31.5 g. of 60% sodium sulfide flakes, 8.2 g. sulfur and 50 ml. water. The reaction mixture was cooled, filtered and the product was recrystallized from water. This product, having the above structural formula, was in the form of yellow crystals and had a melting point of 82° C.

EXAMPLE 7

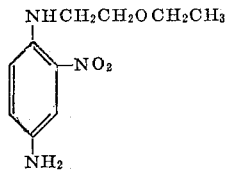

A mixture containing:

1 g. 5% platinum-on-charcoal
12.7 g. N-(2-ethoxyethyl)-2,4-dinitroaniline
75 ml. ethanol
30 g. 50% sulfuric acid was hydrogenated at 50–90 p.s.i. until 3 molar equivalents of hydrogen were absorbed. The mixture was filtered and the precipitate extracted with hot water for removal of the sulfate product. The extract after cooling was made basic with ammonia. The product, which has the above structure, was filtered off and recrystallized from ethanol. This was in the form of red crystals and had a melting point of 86° C.

EXAMPLE 8

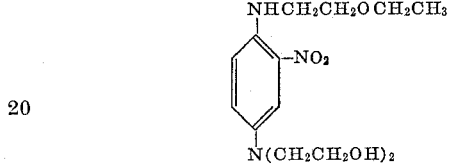

To a solution of N¹-(2-ethoxyethyl)-2-nitro-p-phenylenediamine in 50 ml. ethanol, 150 ml. chloroethanol was added. Over a period of 2 hours at reflux, there was added 200 g. of 25% aqueous NaOH. After steam-distilling off the excess chloroethanol, the residual mixture was extracted with ethyl acetate. On evaporation of the solvent, there was obtained a violet dye of the melting point 52–3° C.

EXAMPLE 9

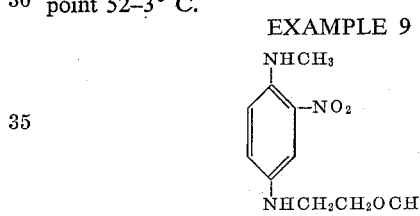

A mixture of 16.7 g. N¹-methyl-2-nitro-p-phenylenediamine, 10.0 g. sodium carbonate, 9.5 g. 2-chloroethyl methyl ether, and 150 ml. n-amyl alcohol was heated at reflux for 10 hours. At this point a test portion examined by paper chromatography showed the presence of reddish violet product and a significant amount of the starting primary amine N-methyl - 2 - nitro-p-phenylenediamine; however, no tertiary amine by-product was present. The reaction mixture was steam-distilled and evaporated to dryness, and the residue dissolved in 100 ml. ethanol. Then, for removal of the unreacted primary amine, 10.6 g. benzaldehyde was added, the mixture heated for 1 hour, and the precipitated benzal derivative of N-methyl-2-nitro-p-phenylene-diamine filtered off. Excess benzaldehyde was removed from the filtrate by steam distillation, and the desired product extracted using ethyl acetate. The extract was taken to dryness, 50 ml. ethanol added, and HCl gas admitted, thereby precipitating 5.5 g. of the hydrochloride of N¹-methyl-N⁴-(2-methoxyethyl)-2-nitro-p-phenylenediamine as yellow crystals; this was filtered off and used as such in dyeing experiments described below.

EXAMPLE 10

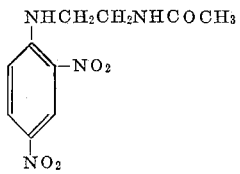

To 56.5 g. N-(2-aminoethyl)-2,4-dinitroaniline in 300 ml. water, there was added 30 g. acetic anhydride. The mixture was heated at 80° C., cooled and then filtered. The filter cake obtained was then washed. There was recovered 58 g. of acetylated product of the above structure having a melting point 174–7° C.

Calcd. for $C_{10}H_{12}N_4O_5$ (percent): N, 20.9. Found (percent): N, 20.7.

EXAMPLE 11

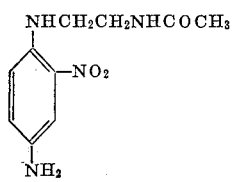

A mixture containing:

1 g. 5% platinum-on-charcoal
100 ml. concentrated HCl
110 ml. ethanol
13.7 g. N-(2-acetamidoethyl)-2,4-dinitroaniline was hydrogenated at atmospheric pressure until 3 molar equivalents of hydrogen were absorbed. The reaction mixture was then filtered and the precipitate was slurried in 100 ml. of water and refiltered for removal of the catalyst. Ammonia was added to the filtrate until it was basic. Violet crystals were then filtered off which had a melting point of 87–90° C.; the product has the above structural formula.

Calcd. for $C_{10}H_{14}N_4O_3$ (percent): N, 23.5. Found (percent): N, 23.5.

EXAMPLE 12

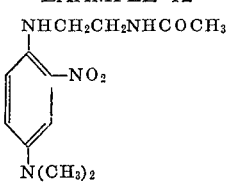

A mixture of the dye, $N^1$-(2-acetamidoethyl)-2-nitro-p-phenylenediamine, 2.5 molar equivalents of dimethyl sulfate, and 2 molar equivalents of sodium carbonate, in 50% aqueous alcohol, was heated at reflux until no further change was evident on a paper chromatogram. The alcohol was then distilled off, and the mixture cooled. The precipitated product, which has the structure formulated above, was filtered off, washed and dried.

EXAMPLE 13

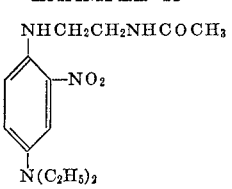

A mixture of $N^1$-(2-acetamidoethyl)-2-nitro-p-phenylenediamine, 3.5 molar equivalents of ethyl iodide, and 2 molar equivalents of sodium carbonate, in 50% aqueous ethanol were heated in an autoclave at 80–90° C. for about 14 hours. The alcohol was then distilled off, and the product isolated by filtering and washing. It has the structure formulated above.

EXAMPLE 14

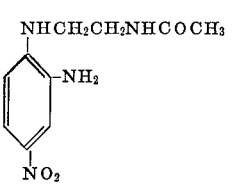

A mixture of:

13.4 g. N-(2-acetamidoethyl)-2,4-dinitroaniline
60 ml. water
60 ml. isopropanol was heated at 70–80° C. While heating this mixture, there was added dropwise a solution of:

4.7 g. sulfur
17.7 g. 60% sodium sulfide flakes
18 ml. water

The reaction mixture was cooled, filtered and the precipitate obtained was washed with water and recrystallized from 50 ml. ethanol. There was obtained 5.0 g. of the product of the above structure. This was in the form of orange crystals having a melting point of 198–201° C.

Calcd. for $C_{10}H_{14}N_4O_3$ (percent): N, 23.5. Found (percent): N, 23.1.

EXAMPLE 15

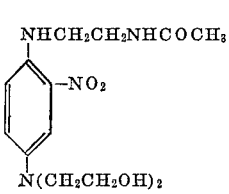

A solution of $N^1$-(2-acetamidoethyl)-2-nitro-p-phenylenediamine in 150 ml. ethanol was heated to reflux. Ethylene oxide was passed in and the reaction mixture was periodically examined by paper chromatogram (developed with water). When the chromatogram showed the virtual absence of the red starting material, and the appearance of essentially only a violet spot, the reaction was terminated. After evaporation of the solvent, there remained a viscous violet oil which did not crystallize on standing. The product has the structure formulated above.

EXAMPLE 16

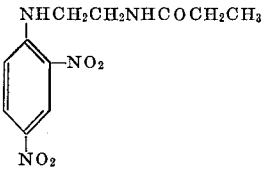

A mixture of:

56.5 g. N-(2-aminoethyl)-2,4-dinitroaniline
500 ml. water
30 g. Propionic anhydride was stirred at room temperature for 30 minutes. This was then heated to 80° C., cooled, and the precipitate which had formed was filtered off, washed and dried. The yield was 49.5 g. and the product had a M.P. of 156–60° C.

EXAMPLE 17

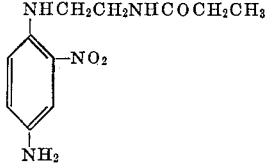

A mixture containing:

1 g. 5% platinum-on-charcoal
10 ml. conc. HCl
14.1 g. $N^1$-(2-propionamidoethyl)2,4-dinitroaniline
200 ml. Ethanol was hydrogenated at about 50 p.s.i. until 3 molar equivalents of $H_2$ were absorbed. A precipitate was formed which was filtered off, slurried in hot water and then refiltered for removal of the catalyst. To the filtrate was added ammonia. The product which precipitated was filtered off. There was obtained 4.5 g. of a product in the form of red crystals which had a melting point of 125–7° C.; it has the structural formula shown above.

*Analysis.*—Calcd. for $C_{11}H_{16}N_4O_3$ (percent): N, 22. Found (percent): N, 22.6.

EXAMPLE 18

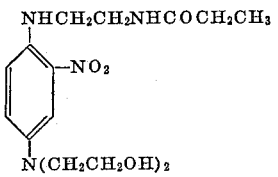

In a solution of:

6.3 g. $N^1$-(2 - propionamidoethyl)-2-nitro-p-phenylenediamine
170 ml. Ethanol was bubbled ethylene oxide until a test portion chromatographed on paper was essentially homogeneous. After evaporation of the ethanol, there was obtained a viscous purple liquid which did not crystallize.

EXAMPLE 19

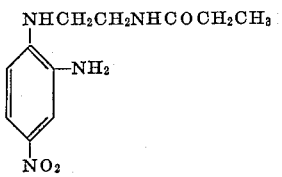

Into a mixture of:

14.1 g. N-(2-propionamidoethyl)-2,4-dinitroaniline
60 ml. Water
60 ml. Ethanol heated to a temperature of 70° C. was dropped a solution of:

4.7 g. Sulfur
17.7 g. 60% Sodium sulfide flakes
18 ml. Water

The mixture was cooled and a precipitate was filtered from the reaction mixture. The filter cake was recrystallized from dilute aqueous ethanol; yield 6.9 g.; M.P. 171–3° C.

Calcd. for $C_{11}H_{16}N_4O_3$ (percent): N, 22.2. Found (percent): N, 22.7.

EXAMPLE 20

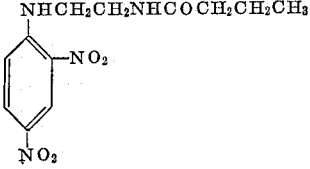

Into a mixture of:

21 g. N(2-aminoethyl)2,4-dinitroaniline
7 g. Sodium carbonate
200 ml. benzene at reflux was dropped 12 ml. butyryl chloride over a period of 45 minutes. The reaction mixture was cooled and filtered and the cake was washed with water and recrystallized from ethanol; Yield: 18.6 g.; M.P. 180–12° C.

Calcd. for $C_{12}H_{16}N_4O_5$ (percent): N, 18.8. Found (percent): N, 19.1.

EXAMPLE 21

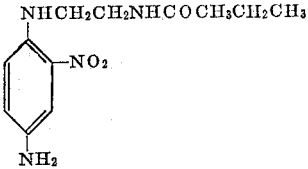

A mixture of:

1 g. 5% platinum-on-charcoal
10 ml. conc. HCl
200 ml. Ethanol
14.8 g. N(acetamido-propyl-2-4-dinitroaniline was hydrogenated at about 50 p.s.i. until 3 molar equivalents of hydrogen were absorbed. From the reaction mixture there was isolated 3 g. of the hydrochloride salt of the product of the above structure by filtration and recrystallization from alcohol. It was used as such in the dyeing experiments described below.

EXAMPLE 22

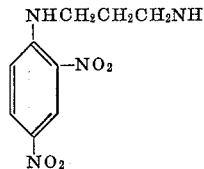

To a solution of 300 g. 1,3-diaminopropane in 500 ml. ethanol heated at reflux was added 202 g. 2,4-dinitrochlorobenzene. The heating was continued for an additional 30 minutes, and the mixture filtered hot in order to separate the insoluble N,N'-bis(2,4 - dinitrophenyl)-1,3-diaminopropane obtained as a by-product. The filtrate was diluted with cold water and N(3 - aminopropyl)-2,4-dinitroaniline (225 g.) crystallized out; M.P. 76–9° C. This was recrystallized from carbon tetrachloride; M.P. 86–7° C.

*Analysis.*—Calcd. for $C_9H_{12}N_4O_4$ (percent): C, 45.0; H, 5.00; N, 23.3. Found (percent): C, 45.1; H, 5.18; N, 22.8.

EXAMPLE 23

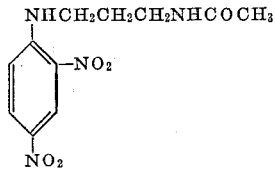

A mixture of:

120 g. N-(3-aminopropyl)2,4-dinitroaniline
500 ml. Water and ice
90 ml. Acetic anhydride was stirred for two hours. The mixture was filtered, and the filter cake was washed and dried; Yield, 90.5 g.; M.P. 149–50° C.

EXAMPLE 24

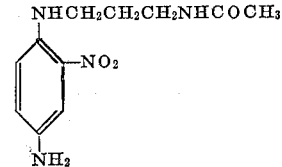

A mixture of:

1 g. 5% platinum-on-charcoal
10 ml. conc. HCl
150 ml. Ethanol
14.1 g. N(3-acetamidopropyl-2,4-dinitroaniline was hydrogenated at 50 p.s.i. When 3 molar equivalents of hydrogen had been absorbed, the hydrogenation was terminated. The mixture was filtered and the hydrochloride of the product was extracted from the filter cake with hot water. After removal of the water, the residue of the hydrochloride was recrystallized from ethanol; yield 3.1 g.

*Analysis.*—Calcd. for $C_{11}H_{17}ClN_4O_3$ (percent): Cl, 12.3; N, 19.4. Found (percent): Cl, 12.6; N, 19.1.

EXAMPLE 25

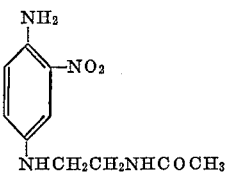

A slurry of 19.6 g. N⁴-(2-aminoethyl)-2-nitro-p-phenylenediamine in 150 ml. water was treated with 10.2 g. acetic anhydride, and the mixture warmed gently at 40–50° C. for 10 minutes, and then at 80° C. for one hour. After cooling the mixture was basified, extracted with ethyl acetate, and the extract dried over anhydrous magnesium sulfate. The ethyl acetate was removed and replaced with 100 ml. ethanol. Dry hydrogen chloride gas was bubbled in, thereby precipitating the yellow crystals which are the hydrochloride salt of the above formulated product. They were used as such in dyeing experiments, as described below.

EXAMPLE 26

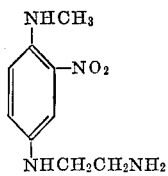

A mixture of 16.7 g. N¹-methyl-2-nitro-p-phenylenediamine, 40.8 g. 2-bromoethylamine hydrobromide, 175 ml. water, and 75 ml. isopropanol was treated with sodium carbonate until slightly alkaline; 10.6 g. being required. To this was added dropwise over one-half hour, at 75–80° C., a 25% solution of 4.8 g. sodium hydroxide. After reflux for another hour, the alcohol was distilled off, the residue cooled, salted, and treated with 2 ml. conc. HCl until just neutral (pH 6–7). The precipitate, which was the free base of the product, having the above formulated structure, was filtered off, washed with 5% brine, and then with water. Yield, 12.0 g. of violet crystals, M.P. 62–64° C., having essentially a single colored component by paper chromatography.

EXAMPLE 27

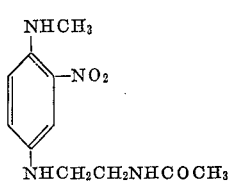

The compound, N¹-methyl-N⁴-(2-aminoethyl)-2-nitro-p-phenylenediamine (product of Example 26), was acetylated by following the procedure of Example 10. The product, which was N¹-methyl-N⁴-(2-acetamidoethyl)-2-nitro-phenylenediamine, was isolated as violet crystals and was used in the dyeing of hair, as described below.

EXAMPLE 28

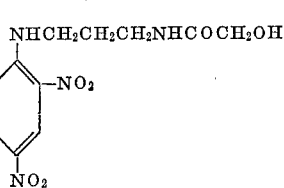

N-(3-aminopropyl)-2,4-dinitroaniline was converted to the glycolyl derivative by reaction with 1.1 molar equivalent of glycolic acid in benzene solution in the presence of sodium bisulfate. The mixture was heated at reflux under a benzene-water separator, so that the water produced during the reaction was co-distilled with benzene as it was formed, and removed from the reaction mixture. Heating was continued until water no longer distilled off. The reaction mixture was taken to dryness, giving N-(3-glycolamidopropyl)-2,4-dinitroaniline, which was washed with water and dried, and used directly in the next synthetic step.

EXAMPLE 29

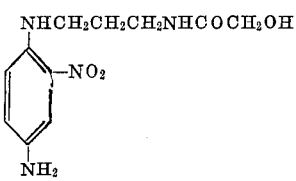

N-(3-glycolamidopropyl)-2,4-dinitroaniline was hydrogenated catalytically according to the procedure of Example 11 for reduction of the 4-nitro group. The product, N¹ - (3 - glycolamidopropyl)-2-nitro-p-phenylenediamine, was isolated as the red free base.

EXAMPLE 30

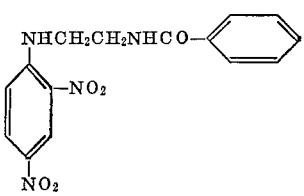

To 56.5 g. of N(2-aminoethyl)-2,4-dinitroaniline in 200 ml. of 5% aqueous NaOH was slowly added, while stirring, 40 g. of benzoyl chloride. The reaction mixture was then stirred for an additional two hours. The reaction product was filtered off and the filter cake was washed well with water. 42 g. of the product, which has the above formulated structure, was obtained. On recrystallization from aqueous dimethylformamide, it had the melting point 188–189° C.

*Analysis.*—Calcd. for C₁₅H₁₄N₄O₅ (percent): N, 17.0. Found (percent): N, 17.0.

EXAMPLE 31

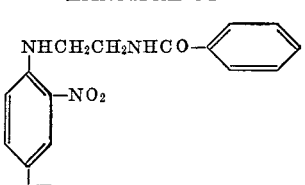

A mixture of:

1 g. 5% platinum-on-charcoal
10 ml. conc. HCl
200 ml. Ethanol
16.4 g. N-(2-benzamidoethyl)-2,4-dinitroaniline was hydrogenated for absorption of 3 molar equivalents of hydrogen. The reaction mixture was filtered hot to remove the catalyst. On cooling, the hydrochloride of the above formulated product precipitated out and was collected by filtration; 3.1 g.; M.P. 231–235° C. From the hydrochloride the free base was recovered; red crystals; M.P. 94° C.

EXAMPLE 32

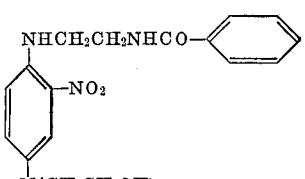

A solution of 5.2 g. N¹-(2-benzamidoethyl)-2-nitro-p-phenylenediamine in 100 ml. of ethanol was heated at reflux and ethylene oxide was passed in until a test portion was chromatographically homogeneous. The solvent was evaporated off giving a thick violet oil which did not crystallize on standing.

EXAMPLE 33

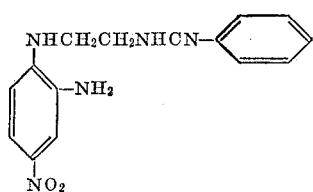

To a mixture of:

10 g. N-(2-benzamidoethyl)-2,4-dinitroaniline
70 ml. 50% aqueous isopropanol heated to 60° C. was added a solution of:

15 g. 60% sodium sulfide flakes
4.2 g. Sulfur
30 ml. Water

This mixture was heated for ½ hour and then cooled and filtered; the filter cake was washed with water. Yield 5.3 g.; M.P. 177–81° C.

EXAMPLE 34

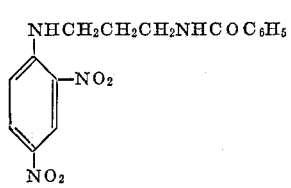

A mixture of 56.5 g. N-(3-aminopropyl)-2,4-dinitroaniline, 40 g. benzoyl chloride, and 200 ml. 5% sodium hydroxide was vigorously stirred at room temperature for two hours. The product was filtered off, washed with water and dilute acid, and recrystallized from aqueous dimethylformamide. Yield, 46 g., M.P. 195–200° C.

Calcd. for $C_{16}H_{16}N_4O_5$ (percent): N, 16.3. Found (percent): N, 16.3.

EXAMPLE 35

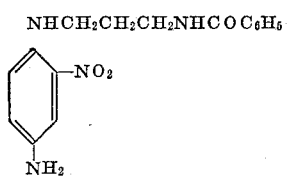

N-(3-benzamidopropyl)-2,4-dinitroaniline was hydrogenated by shaking 16.4 g. of the material in 200 ml. ethanol, containing 1 gram of 5% platinum-on-charcoal catalyst, and 100 ml. conc. HCl, at about 50 p.s.i. hydrogen, until three molar equivalents of hydrogen were absorbed. The reaction mixture was filtered to remove the catalyst, and the filtrate reduced to a volume of 25 ml. and set in the cold. After some time a precipitate of 1 g. of the hydrochloride of the above formulated product was obtained as yellow crystals of M.P. 222–225° C.

Analysis.—Calcd. for $C_{16}H_{19}ClN_4O_3$ (percent): N, 17.8. Found (percent): N, 17.9. The mother liquor contained considerably more of the product, as shown chromatographically, and this could be recovered in less pure form, and as the free base by basification of the liquor.

EXAMPLE 36

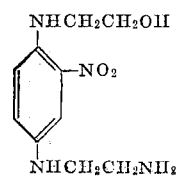

To a mixture of:

19.7 g. $N^1$-(2-hydroxyethyl)-2-nitro-p-phenylene-diamine
75 ml. Isopropanol
175 ml. Water
61.2 g. 2-bromoethylamine hydrobromide neutralized with sodium carbonate to slight alkalinity was added dropwise at 75° C. to 80° C., over a period of 20 minutes, 6.0 g. sodium hydroxide in the form of a 25% solution. Refluxing was continued for one-half hour. Then the alcohol was distilled off, and the mixture salted at room temperature and acidified with hydrochloric acid. The light brown precipitate which formed was filtered off, and washed with a little water. Upon recrystallization from 150 ml. boiling water, there was obtained 12.0 g. golden yellow crystals of the hydrochloride of $N^1$-(2-hydroxyethyl)-$N^4$-(2-aminoethyl) - 2 - nitro-p-phenylene; M.P. 193–174° C., pure by chromatographic analysis.

EXAMPLE 37

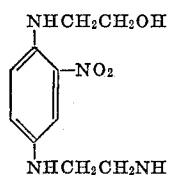

A mixture of 24.0 g. $N^1$-(2-hydroxyethyl)-$N^4$-(2-aminoethyl)-2-nitro-p-phenylenediamine, 125 ml. 5% aqueous sodium hydroxide and 15.5 g. benzoyl chloride was vigorously shaken in a bottle at room temperature until the odor of benzoyl chloride had disappeared (about 1 hour). The mixture was then warmed at 40–50° C. for ½ hour for saponification of any benzoyloxy group which may have formed. The reaction product was then filtered off, and was in the form of violet crystals having the above formulated structure.

EXAMPLE 38

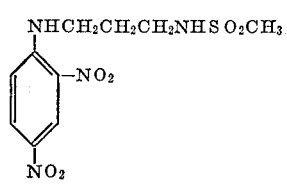

A mixture of 24 g. N-(3-aminopropyl)-2,4-dintroaniline, 11.4 g. methanesulfonyl chloride, 9 g. sodium bicarbonate, and 100 ml. ethanol was heated at reflux for 4½ hours. The product, which precipitated on cooling, was filtered off, washed with hot water and dried. Yield, 11.5 g.; M.P. after recrystallization from ethanol, 162–165° C.

Analysis.—Calcd. for $C_{10}H_{14}N_4O_6S$ (percent): N, 17.5. Found (percent): N, 17.3.

EXAMPLE 39

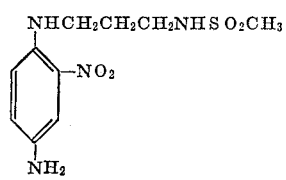

A method of 3.18 g. N-(3-methylsulfonamidopropyl)-2,4-dinitroaniline, 0.3 g. platinum-on-charcoal (5%), 2 ml. conc. HCl, and 125 ml. ethanol was hydrogenated until three molar equivalents of hydrogen were absorbed. No precipitate had formed. The catalyst was filtered off. The filtrate was evaporated to dryness and the residue dissolved in water. The aqueous solution was then extracted with ethyl acetate for removal of the by-product, which is an isomer of the desired product. Afterwards, the solution was made alkaline, and the red dye which partly precipitated was extracted from the mixture with ethyl acetate. There was obtained 1.8 g. of red dye of the M.P. 114–7° C., having the structure formulated above.

EXAMPLE 40

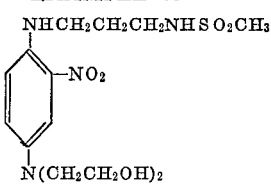

The dye, N¹-(3-methylsulfonamidopropyl)-2-nitro-p-phenylene-diamine, was hydroxyethylated by bubbling ethylene oxide through a solution of the dye in ethanol, at reflux temperature. When sufficient ethylene oxide had been bubbled in, as determined chromatographically by the appearance of a maximum of a bluish violet spot, the reaction mixture was taken to dryness. The residue was recrystallized from aqueous dimethylformamide, and appeared as dark violet crystals; it has the above designated structure.

EXAMPLE 41

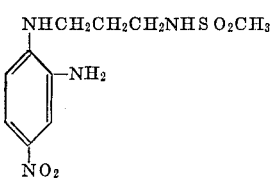

To a solution of 21 g. N-(3-methylsulfonamidopropyl)-2,4-dinitroaniline in 150 ml. ethanol was added a polysulfide solution prepared from 14.7 g. sodium sulfide and 3.9 g. sulfur dissolved in 45 ml. water. The addition was carried out at 70–80° C. over a period of one-half hour, and heating was continued for an additional one-half hour. The reaction mixture was then poured on ice, and the precipitate collected by filtration, washed with water and dried. It was recrystallized from ethanol; yield, 11.6 g.; M.P. 157–160° C.

EXAMPLE 42

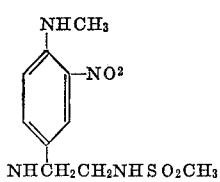

N¹-methyl-N⁴-(2 - aminoethyl)-2-nitro-p-phenylenediamine was treated with methanesulfonyl chloride according to the procedure of Example 38. There was obtained a bluish red product, N¹-methyl-N⁴-(2 - methylsulfonamidoethyl) - 2 - nitro-p-phenylenediamine.

EXAMPLE 43

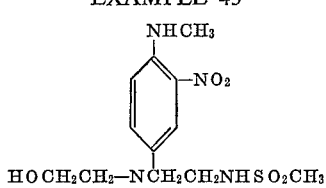

The dye, N¹-methyl-N⁴-(2-methylsulfonamidoethyl)-2-nitro-p-phenylenediamine, was hydroxyethylated by following the procedure of Example 15. There was obtained a bluish violet dye which dyed hair according to the procedures described below.

EXAMPLE 44

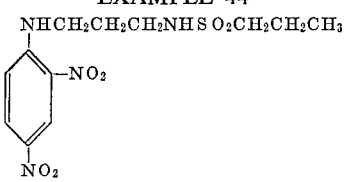

A mixture of:

22 g. N(3-aminopropyl)2,4-dinitroaniline
9 g. Sodium bicarbonate
15 g. Propanesulfonyl chloride
130 ml. Ethanol was heated at reflux for 6 hours. The reaction mixture was cooled, filtered and the filter cake recrystallized from methanol. 5.9 g. of product were obtained; M.P. 150–2° C.

*Analysis.*—Calcd. for $C_{12}H_{18}N_4O_6S$ (percent): N 16.2. Found (percent): N, 16.0.

EXAMPLE 45

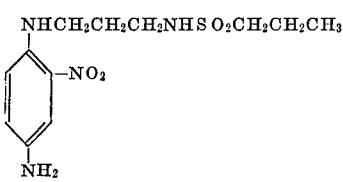

A mixture of:

0.2 g. 5% platinum-on-charcoal
2 ml. conc. HCl
3.46 g. N(3-propanesulfonamidopropyl)2,4-dinitroaniline
200 ml. Methanol was hydrogenated according to the procedure of Example 11. There was obtained 1.0 g. of the product of the above formulated structure, as the free base; M.P. 139–42° C.; M.P. of the hydrochloride 215–18° C.

EXAMPLE 46

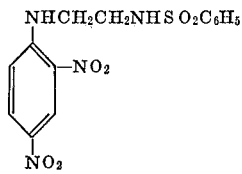

A mixture of 22.6 g. N-(2-aminoethyl)-2,4-dinitroaniline, 17.7 g. benzenesulfonyl chloride, 10 g. sodium bicarbonate, and 100 ml. ethanol was heated at reflux for 5 hours. After cooling, the product, having the above formulated structure, was filtered off and washed with water. Yield, 15.6 g.; M.P. 159–160° C.

*Analysis.*—Calcd. for $C_{14}H_{14}N_4O_6S$ (percent): N, 15.3. Found (percent): N, 15.3.

EXAMPLE 47

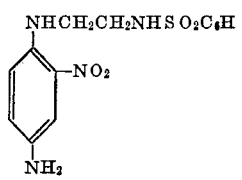

N-(2 - benzenesulfonamideoethyl) - 2,4-dinitroaniline was hydrogenated catalytically, essentially according to the procedure of Example 11, in which platinum-on-charcoal is the catalyst, and the hydrogenation is carried out in alcohol in the presence of conc. HCl. When the reduction was complete, the product, which had precipitated out as the hydrochloride, was filtered off together with the catalyst, and then extracted from the catalyst by means of hot water. On concentrating and cooling, the hydrochloride precipitated out of the aqueous medium as yellow needles, from which the red free base was recovered. It has the above formulated structure.

EXAMPLE 48

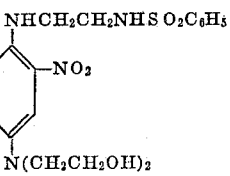

N¹-(2 - benzenesulfonamidoethyl)-2-nitro-p-phenylenediamine was subjected to hydroxyethylation following the procedure of Example 15, in which a hot ethanolic solution of the starting material is treated with ethylene oxide. When the reaction was essentially complete, as shown by a paper chromatogram, the solvent was evaporated off. The residue of reddish violet dye consisted essentially of the compound of the above formulated structure, and was used directly in dyeing experiments as described below.

EXAMPLE 49

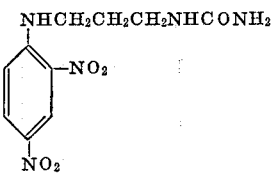

A mixture of:

24 g. N(3-aminopropyl)2,4-dinitroaniline
70 g. Urea was heated for 5 hours at 150–165° C. Water was added to the reaction mixture to dissolve the excess urea and the reaction mixture was filtered. 12 g. of the product was obtained; M.P. 186–9° C.

EXAMPLE 50

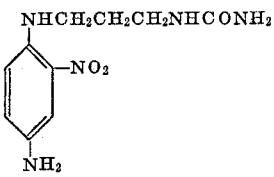

A mixture of:

0.2 g. 5% platinum-on-charcoal
2 ml. conc. HCl
150 ml. Ethanol
2.83 g. N(3-ureidopropyl)-2,4-dinitroaniline was hydrogenated as in the previous examples for reduction of the nitro group in the 4-position. The hydrochloride of the product did not separate by crystallization from the reaction mixture. The mixture of bases was therefore chromatographed on a silica gel column. Development was effected by a mixture of 90% CHCl₃ and 10% CH₃OH. The red band was eluted using the same solvent mixture, giving 0.7 g. of the product in the form of dark red crystals; M.P. 173–6° C.; it has the above formulated structure.

EXAMPLE 51

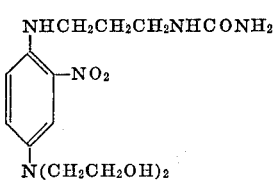

Into a solution of 4 g. N¹-(3-ureidopropyl)-2nitro-p-phenylenediamine in ethanol at reflux was bubbled ethylene oxide until a test portion chromatographed on paper showed essentially a single violet band. On evaporation to dryness there was obtained a violet viscous product was used directly in the dyeing of hair, described below.

EXAMPLE 52

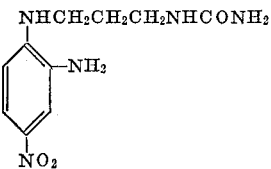

To a solution of 28 g. N-(3-ureidopropyl)-2,4-dinitroaniline in 75 ml. 50% isopropanol maintained at 70–75° C. was added dropwise, over one-half hour; a solution of 19.3 g. fused 60% sodium sulfide flakes and 5.1 g. sulfur in 30 ml. water. After additional heating for one-half hour and cooling, there precipitated the product, of the above designated structure; it was filtered off, washed with water and dried. The orange product was used as such in the dyeing of hair, as described below.

EXAMPLE 53

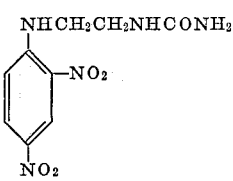

A mixture of N-(2-aminoethyl)-2,4-dinitroaniline and 5 molar equivalents of urea was fused at 150–160° C. for 5 hours. The excess urea was then extracted with water, and the product was filtered, thoroughly washed and dried. It was used as such in the next synthetic step.

EXAMPLE 54

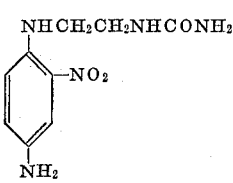

N-(2-ureidoethyl)-2,4-dinitroaniline was reduced catalytically according to the procedure of Example 50. The product was separated chromatographically on a silica gel column as in that example, and was obtained as red crystals having the above formulated structure.

EXAMPLE 55

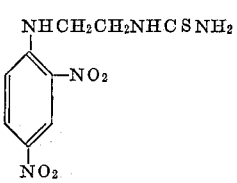

To a mixture of 7.6 g. carbon disulfide and 4.0 g. sodium hydroxide in 75 ml. water was added portionwise 22.6 g. N-(2-aminoethyl)-2,4-dinitroaniline with vigorous stirring and occasional cooling. When addition was complete, the reaction mixture was warmed at 85–90° C. for about 2 hours. It was then allowed to cool to 34–40° C., and 10.8 g. ethyl chloroformate was added dropwise with no further temperature control. The reaction mixture was stirred until the exotherm was complete and the mixture had cooled down to room temperature. The precipitated solid, 2 - (2,4 - dinitroanilino)ethyl isothiocyanate, was filtered off, washed with aqueous alcohol and water and dried.

The above isothiocyanate was dissolved in ethanol and dry ammonia gas was bubbled through the solution. The exotherm brought the solution to reflux temperature, and it was allowed to reflux for an additional hour. Part of the alcohol was then distilled off, the mixture poured on ice, and the product collected by filtration, and washed with water and dried. The product was N-(2-thioureidoethyl)-2,4-dinitroaniline having the above formulated structure, and was used directly in the next synthetic step.

EXAMPLE 56

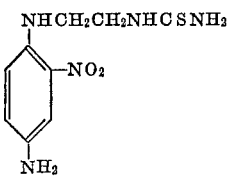

The compound, N-(2-thioureidoethyl)-2,4-dinitroaniline (product of Example 55), was reduced catalytically according to the procedure of Example 50. In this case also the hydrochloride of the product did not crystallize out of the reaction mixture. The reaction mixture, after removal of the catalyst, was therefore made basic with ammonia, and extracted with ethyl acetate for recovery of the mixed primary amines obtained. The mixed amines were chromatographed on a column of silica gel, using chloroformmethanol 9:1 for development. The red band was cut out of the column and the product extracted therefrom. It appeared as dark red crystals and had the above designated structure.

EXAMPLE 57

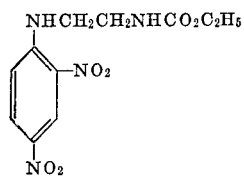

N-(2-aminoethyl)-2,4-dinitroaniline was treated with one molar equivalent of ethyl chloroformate in pyridine solution by stirring the mixture of components at room temperature for about one hour. The reaction mixture was then drowned in water and the precipitated product N - (2 - carbethoxyaminoethyl)-2,4-dinitroaniline, filtered off, washed and dried.

EXAMPLE 58

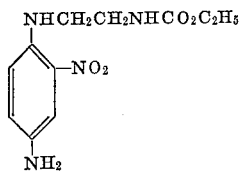

The compound, N - (2 - carbethoxyaminoethyl)-2,4-dinitroaniline was hydrogenated according to the procedure of Example 24. The hydrochloride of the product having the above formulated structure was recovered as yellow crystals, and was used directly in the dyeing experiments described below.

EXAMPLE 59

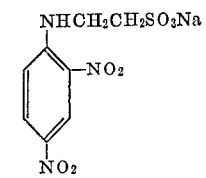

To a solution of 62.5 g. taurine and 4.2 g. sodium bicarbonate in 400 ml. water heated at reflux was added slowly 101 g. 2,4-dinitrochlorobenzene. Heating was continued for an additional 3 hours. After cooling, the precipitated crystals were filtered off, pressed dry and recrystallized from hot water containing a small amount (about 1%) of sodium hydroxide. The product is N-(2-sulfoethyl)-2,4-dinitroaniline.

EXAMPLE 60

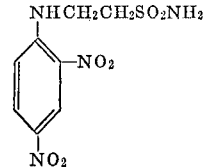

To a slurry of 20 g. N-(2-sulfoethyl)-2,4-dinitroaniline in 100 ml. dry xylene was added 15 g. $PCl_5$ and the mixture was heated at reflux for 5 hours. The reaction mixture was then poured on ice, and the precipitate filtered off. The filter cake was pressed dry, then stirred with an excess of conc. aqueous ammonia overnight at room temperature. The product was filtered off and recrystallized twice from water. There was obtained 1.8 g. of N-(2-sulfamoylethyl)-2,4-dinitroaniline; M.P. 165–9° C.

*Analysis.*—Calcd. for $C_8H_{10}N_4O_6S$ (percent): N, 19.3; S, 11.0. Found (percent): N, 18.7; S, 10.7.

EXAMPLE 61

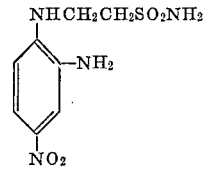

To a solution of 7.3 g. N(2-sulfamoylethyl)2,4-dinitroaniline in 20 ml. 50% isopropanol at 70° C. was added with stirring over a period of 20 minutes a solution of 6.3 g. 60% sodium sulfide flakes, and 1.7 g. sulfur in 10 ml. water. Heating was continued for an additional one-half hour. On cooling, the product, which had the above formulated structure, precipitated out and was filtered off. It was recrystallized from ethanol; dark orange crystals, M.P. 216–218° C.

EXAMPLE 62

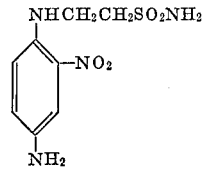

A mixture of 1 g. N-(2-sulfamoylethyl)-2,4-dinitroaniline, 0.1 g. 5% platinum-on-charcoal, 1 ml. conc. HCl, and 100 ml. methanol was hydrogenated at atmospheric pressure and room temperature until 250 ml. hydrogen gas was absorbed. The catalyst was filtered off, and upon concentration of the filtrate the product precipitated out as the hydrochloride salt, which was filtered off and washed with a minimum of methanol. It was chromatographically pure, and was the hydrochloride of the product formulated above.

*Analysis.*—Calcd. for $C_8H_{13}ClN_4O_4S$ (percent): N, 18.8. Found (percent): N, 18.3.

The free base was red.

EXAMPLE 63

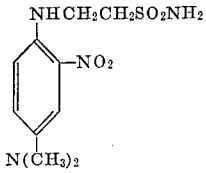

The dye, $N^1$-(2-sulfamoylethyl)-2-nitro-p-phenylenediamine was treated with 2.5 molar equivalents of dimethyl sulfate and 2 molar equivalents of sodium carbonate in 50% aqueous ethanol. The mixture was heated at reflux until no further change was observed in the chromatogram. After distillation of most of the alcohol, the product was recovered by filtration; it was washed and dried.

The dark violet product was used as such for the dyeing of hair, as described below.

EXAMPLE 64

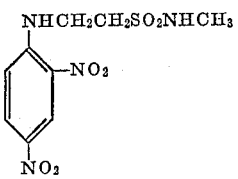

The procedure of Example 60 was followed except that in place of ammonia there was used an excess of 40% aqueous methylamine. The product was N-[2-(methylsulfamoyl)ethyl]-2,4-dinitroaniline.

EXAMPLE 65

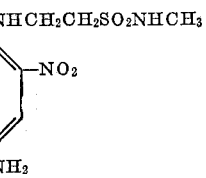

The procedure of Example 62 was followed except that the dinitroaniline derivative used was N-[2-(methylsulfamoyl)ethyl]-2,4-dinitroaniline. The product was the hydrochloride of the dye of the above formulated structure. This salt was used directly in the subsequent hair dyeing experiments, described below.

EXAMPLE 66

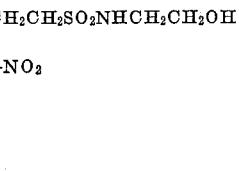

The procedure of Example 60 was followed except that in place of ammonia there was used an excess of 50% aqueous ethanolamine. The product was N-[2-(2-hydroxyethylsulfamoyl)ethyl]-2,4-dinitroaniline and was used in the next example.

EXAMPLE 67

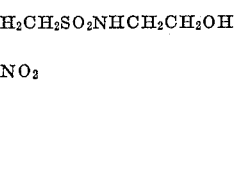

The procedure of Example 62 was followed except that the dinitroaniline derivative used was N-[2-(2-hydroxyethylsulfamoyl)ethyl]-2,4-dinitroaniline. The product was the hydrochloride of the dye having the above formulated structure. The yellow hydrochloride product was used in the later hair dyeing experiments.

EXAMPLE 68

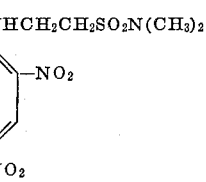

The procedure of Example 60 was followed, except that in place of ammonia there was used an excess of 25% aqueous dimethylamine. The product was N-[2-(dimethylsulfamoyl)ethyl]-2,4-dinitroaniline. It was used in the following example.

EXAMPLE 69

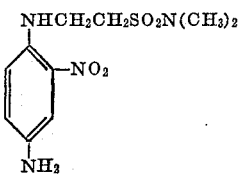

Hydrogenation was carried out according to the procedure of Example 62, except that the dinitroaniline derivative used was N-[2-(dimethylsulfamoyl)ethyl]-2,4-dinitroaniline. The product isolated was the hydrochloride corresponding to the above formulated structure. This product was used as such in the dyeing experiments mentioned below.

EXAMPLE 70

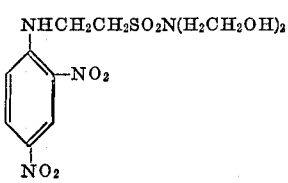

The procedure of Example 60 was followed, except that in place of ammonia there was used 25% aqueous diethanolamine. The product was N-[2-(bis-2-hydroxyethylsulfamoyl)ethyl]-2,4-dinitroaniline.

EXAMPLE 71

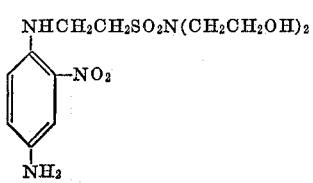

The compound, N-[2-(bis-2-hydroxyethylsulfamoyl)-ethyl]-2,4-dinitroaniline was hydrogenated according to the procedure of Example 62. There was obtained the hydrochloride of the base whose structure is formulated above. It was used in this form for the dyeing of hair, as described below.

EXAMPLE 71A

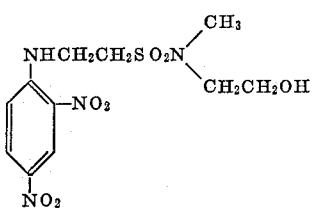

The procedure of Example 60 was followed except that in place of ammonia there was used 25% aqueous 2-methylaminoethanol. The product was N-[2(N-methyl-N-2-hydroxyethylsulfamoyl)ethyl]-2,4-dinitroaniline.

EXAMPLE 71B

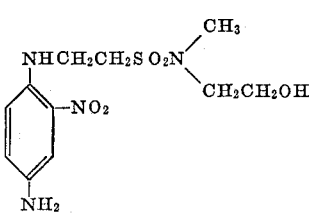

The compound N-[2(N-methyl-N-2-hydroxyethylsulfamoyl)ethyl]-2,4-dinitroaniline was hydrogenated according to the procedure of Example 62. There was obtained the hydrochloride of the base whose structure is formulated above. It was used in this form for the dyeing of hair, as described below.

EXAMPLE 72

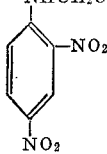

A solution of 25 g. 2-aminoethyl methyl sulfone, in 200 ml. isopropanol containing 8.4 g. sodium bicarbonate was heated at reflux temperature. To the mixture was added dropwise 10.2 g. 2,6-dinitrochlorobenzene over a period of one-half hour. The reaction mixture was heated at reflux for another hour. About half the alcohol was distilled off and water added, thereby precipitating the product whose structure is shown above. It was filtered off, washed with aqueous isopropanol, then with water, and dried. The product was used without further purification in the next synthetic step.

EXAMPLE 73

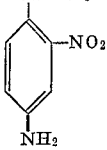

The compound N-(2-methylsulfonylethyl)-2,4-dinitroaniline was hydrogenated according to the procedure of Example 47. The product, of the structure formulated above, was isolated as the yellow hydrochloride as in that example. It was chromatographically pure, and was converted to the red free base for the dyeing experiments performed on hair, which are described below.

EXAMPLE 74

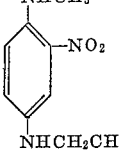

A solution of $N^1$-methyl-2-nitro-p-phenylenediamine and 5 g. methyl vinyl ketone in 100 ml. ethanol was heated at reflux for 5 hours. The chromatogram at this point showed a single, violet component to be present. The reaction mixture was clarified, and concentrated to 75 ml. On cooling, the product, which had the above formulated structure, crystallized out. There was obtained 5 g. of red crystals of M.P. 120–123° C., which was essentially pure by chromatogram.

Calcd. for $C_{11}H_{15}N_3O_3$ (percent): N, 17.7. Found (percent): N, 17.2.

EXAMPLE 75

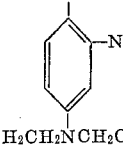

The dye, $N^1$-methyl-$N^4$-(3-oxobutyl)-2-nitro-p-phenylene-diamine (product of Example 74) was hydroxyethylated by treatment with ethylene oxide according to the procedure of Example 15, except that methanol was used as the solvent instead of ethanol. When the reaction was terminated, as indicated by no further change in a chromatographic test, the reaction mixture was chromatographed on a silica gel column, developing with a methanolchloroform 1:9 mixture. The product, having the structure formulated above, was recovered from the bluish violet band found on the column, and was used for the dyeing of hair as described below.

EXAMPLE 76

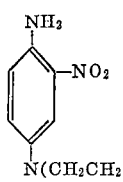

A mixture of 15.3 g. 2-nitro-p-phenylenediamine, 14 g. methyl vinyl ketone, and 150 ml. ethanol was heated at reflux for 8 hours. Afterwards it was allowed to cool overnight, and the crystalline precipitate filtered off. These crystals showed a single, violet band when examined chromatographically. They were recrystallized from ethanol, giving 15 g. violet crystals, M.P. 125–7° C.

Analysis.—Calcd. for $C_{14}H_{19}N_3O_4$ (percent): C, 57.4; H, 6.48; N, 14.3. Found (percent): C, 57.4; H, 6.73; N, 14.0.

EXAMPLE 77

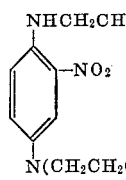

The hydrochloride of $N^1$-(2-hydroxyethyl)-2-nitro-p-phenylenediamine was treated with 4 molar equivalents of methyl vinyl ketone in alcohol under reflux. When the reaction was essentially complete, the mixture was concentrated to a small volume and, on cooling, the product which has the structure designated above, precipitated out, and was filtered off. The purple crystals were used to dye hair as described in later examples.

EXAMPLE 78

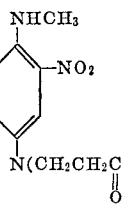

The compound, $N^1$-methyl-2-nitro-p-phenylenediamine, was treated with 4 molar equivalents of hydroxymethyl vinyl ketone according to the conditions and procedure of Example 76. There was obtained the product having the above formulated structure as a violet powder which was used in the dyeing experiments described below.

EXAMPLE 79

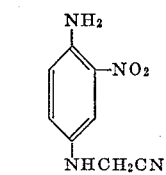

A mixture of:

15.3 g. 2-nitro-p-phenylenediamine
47.4 g. pyridine
75 ml. isopropanol was heated under reflux at 92° C., and over a period of 20 minutes, 45.2 g. of chloroacetonitrile was added dropwise at this temperature. After an additional 15 minutes at reflux, the mixture was allowed to cool, diluted with three volumes of water and salted with NaCl. The crystalline substance which separated out was filtered off, washed with water and recrystallized from 1500 ml. of boiling water, with the addition of some active carbon. The yield of product, having the above formulated structure was 8.5 g.; M.P. 151–152° C. It was essentially pure by paper chromatography.

EXAMPLE 80

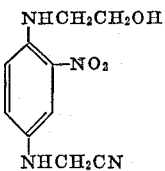

To a mixture of:

19.7 g. $N^1$-(2-hydroxyethyl)-2-nitro-p-phenylenediamine
75 ml. Isopropanol
47.4 g. Pyridine was added dropwise, at reflux during ½ hour 45.3 g. chloroacetonitrile. After refluxing for another ½ hour, the reaction mixture was diluted with two volumes of water and one volume of ice and some salt added. The crystalline product which precipitated was filtered off, and washed to neutrality with cold water. The wet cake was then recrystallized from 1350 ml. of boiling water, with the addition of active carbon; Yield: 13.2 g. of black crystals; M.P. 120–2° C.

*Analysis.*—Calcd. for $C_{10}H_{12}N_4O_3$ (percent): N, 23.7. Found (percent): N, 23.1.

EXAMPLE 81

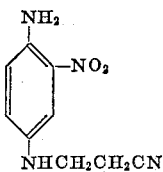

A mixture of:
30.6 g. 2-nitro-p-phenylenediamine
20 g. calcium carbonate
27 g. 3-bromopropionitrile
500 ml. benzene was heated at reflux for 13 hours. On cooling there crystallized out a red product, which was recovered by filtration and recrystallized from ethyl acetate; M.P. 132–133° C. This was the compound shown structurally above.

*Analysis.*—Calcd. for $C_9H_{10}N_4O_2$ (percent): N, 27.2. Found (percent): 27.6.

EXAMPLE 82

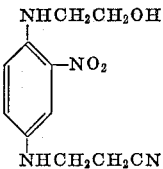

A mixture of:

9.86 g. $N^1$-(2-hydroxyethyl)-2-nitro-p-phenylene-diamine
20.1 g. 3-bromopropionitrile
3.0 g. $Na_2CO_3$ anhydrous
50 ml. isopropanol
35 ml. water was heated at reflux for 5 hours. After about 2 hours more $Na_2CO_3$ (2.5 g.) and more bromopropionitrile (5 g.) were added. When the reaction was complete, the mixture was diluted with 50 ml. water, and allowed to stand overnight. Crystals of product separated (5.2 g. crude), which were recrystallized first from 1:3 ethanol-water and then from 96% ethanol. Yield: 3.5 g. of small metallic crystals, M.P. 69–70° C. The product which has the structure designated above, was homogeneous by chromatogram.

*Analysis.*—Calcd. for $C_{11}H_{14}N_4O_3$ (percent): N, 22.4. Found (percent): N, 22.4.

EXAMPLE 83

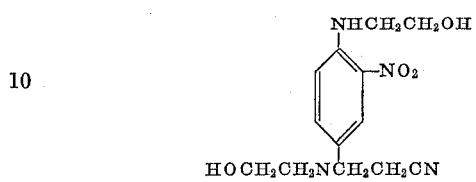

A mixture of 4.38 g. of the dye, $N^1$-(2-hydroxyethyl)-$N^4$-(2-cyanoethyl)-2-nitro-p-phenylenediamine, 6.04 g. 2-chloroethanol, 2.5 g. calcium carbonate and 24 ml. water, containing catalytic amounts of iodine and cuprous chloride was heated at reflux for 12 hours. The reaction mixture was then acidified, clarified, diluted with three volumes of water, and made alkaline. Upon cooling, the product precipitated, and was collected by filtration; M.P. 111–113° C.

EXAMPLE 84

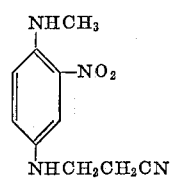

A mixture of:

8.26 g. $N^1$-methyl-2-nitro-p-phenylenediamine
33.5 g. 3-bromopropionitrile
6.0 g. anhydrous sodium carbonate in 35 ml. water and 50 ml. isopropanol was heated at reflux. After about 2 hours additional sodium carbonate (2.5 g.) and bromopropionitrile (10 g.) were added. The total time of refluxing was 5 hours. On cooling and standing overnight crystals separated, which were filtered off and washed by slurrying in 250 ml. water. Yield: 5.4 g. of small metallic needles, M.P. 132–134° C. The product which has the above formulated structure showed a single, violet component by chromatogram.

*Analysis.*—Calcd. for $C_{10}H_{12}N_4O_2$ (percent): N, 25.4. Found (percent): N, 25.1.

EXAMPLE 85

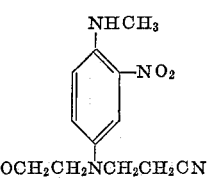

The dye, $N^1$-methyl-$N_4$-(2-cyanoethyl)-2-nitro-p-phenylene-diamine (product of Example 84) was hydroxyethylated by treating it in 50% aqueous ethanol with 3 molar equivalents of ethylene chlorohydrin in the presence of 1.5 molar equivalents of calcium carbonate. The reaction slurry was stirred at reflux temperature until a chromatographic test showed no further change. The mixture was then cooled, acidified to dissolve any calciferous residue, and steam-distilled for removal of the excess chlorohydrin. On basifying and salting, the product, which has the structure formulated above, was precipitated and was recovered by filtering and washing, as violet crystals.

The following examples illustrate the dyeing of hair with compositions containing the dyes described above.

The dyeing procedures used are identified as follows:

Dyeing procedure A.—Dyeing hair with alkaline compositions (pH 7 or higher)

A mixture was prepared using specified amounts of the following components:

Dye (the product of a previous example) ------------------ Amount to be specified.
Isopropanol ------------------ 0.5 ml.
Alkaline agent ------------------ Amount to be specified.
Surface-active agent ---------- Amount to be specified.
Thickening agent ------------- Amount to be specified.

The dye was first wet with isopropanol and the above listed agents were added, as well as 50 ml. water. The mixture was then heated at 60° C. with stirring until a uniform dispersion was obtained. The mixture was then further diluted with water to a volume of 100 ml. and citric acid was added to give a final, specified pH of 7 or higher. The dyeing composition so obtained was poured on natural gray hair and on bleached hair and allowed to remain in contact with the hair for 20 minutes at 30° C. Afterwards, the hair was rinsed in clear water and dried.

Dyeing procedure B.—Dyeing hair with acid compositions (pH 7 or lower)

A mixture was prepared as follows:

Dye ------------------------. Amount to be specified.
Isopropanol ----------------. 0.5 ml.
Surface-active agent --------. Amount to be specified.
Thickening agent ----------. Amount to be specified.
Water ----------------------. To 100 ml.
Acid agent ----------------. To give specified pH of 7 or lower.

The dye was wet with isopropanol, and the other ingredients added with stirring and warming below 50° C. to give a uniform dispersion. Hair was dyed with this composition as in Procedure A.

Procedure C.—Dyeing hair from peroxide bath

The following composition was prepared:

Dye—0.75 g.
Isopropanol—2.5 ml.
Oleic acid—35.0 g.
Polyoxyethylene monooleate (Tween 80)—10.0 g.
Isooctyl phenyl polyethoxyethanol (Triton X–100)—3.5 g.
Ethylenediamine-tetraacetic acid—0.25 g.
28% ammonia—10.0 ml.
Water—To 100 ml.

A 30-ml. portion of this composition was mixed with 30 ml. of 6% hydrogen peroxide and the mixture poured on natural gray and bleached hair and allowed to remain there for 40 minutes at 30° C. The hair was then rinsed with clear water, shampooed and dried.

EXAMPLE 86

The product of Example 2 was dyed on hair according to Procedure A, using 0.25 g. dye, 3.0 g. N-phenyldiethanolamine (as alkaline agent), 3.0 g. sodium N-coconut acid N-methyl taurate) as surfactant), and 3.0 g. hydroxyethylcellulose (as thickener), the pH being adjusted to 9.5. Both gray and bleached hair were dyed in strong level orange shades fast to shampooing. When this composition was stored for 3 months at 50° C. and again dyed on hair, the dyeings were fully equivalent to the initial dyeings in shade and strength.

When the same dye was applied according to Procedure B, using 0.25 g. dye, 1.0 g. nonylphenoxypoly(ethyleneoxy))ethanol (surfactant), 2.0 g. hydroxyethylcellulose(thickener) and citric acid to pH 5, the gray and bleached hair were also dyed uniformly and strongly in orange shade, stable to shampooing. This composition was also unaffected by storage at 50° C. for 3 months.

When the dye was applied by Procedure C, it gave similar orange shades as above, showing its stability to peroxide.

EXAMPLE 87

The product of Example 3 was dyed on hair according to Procedure A, using 0.3 g. dye, 3.0 g. diethylenetriamine (alkaline agent), 4.0 g. lauric diethanolamide (surfactant) and 3.0 g. methylcellulose (thickener), the pH being adjusted to 8.5. A red dyeing of good strength was obtained, somewhat stronger on the bleached than on the gray hair, and both fast to shampooing. When the above composition was stored at 50° C. for 3 months and then again dyed on hair, the dyeing were similar in shade and strength to the initial dyeings.

EXAMPLE 88

The product of Example 8 was dyed on hair according to Procedure A, using 0.15 g. dye, 4.0 g. ethanolamine (alkaline agent), 2.0 g. sodium dodecylbenzenesulfonate, and 3.0 g. sodium carboxymethylcellulose, the final pH being 8.0. Both gray and bleached hair were dyed similar shades of bluish violet having good fastness to shampooing and rubbing. The dye composition was also stored at 50° C. for 3 months and thereafter dyed hair identically to the initial dyeing in shade and strength.

When Procedure B was used with the same dye, using 0.4 g. dye, 2.0 g. ethyleneglycolmonostearate, 2.0 g. methylcellulose, and lactic acid to pH 5.5, the bleached hair was dyed strongly and the gray hair moderately, in level bluish violet shades, fast to shampooing.

EXAMPLE 89

The dye which is the product of Example 14 was applied according to Procedure A, using 0.2 g. dye, 3.0 g. isopropanolamine as the alkaline agent, 4.0 g. coconut acid monoethanolamide (surfactant), 3.0 g. hydroxyethylcellulose, and citric acid to pH 7.5. The dyeings were strong orange shades, similar on both kinds of hair, and fast to shampooing and rubbing. When the pH was adjusted to 9.5, the dyeing were similar.

The same dye was applied by Procedure B using the same quantity of dye, 3.0 g. polyoxyethylated nonylphenol and 3.0 g. methylcellulose, and acetic acid to pH 6.0. Orange dyeings of good strength and uniformity were obtained, fast to shampooing.

When the dye was applied by Procedure C, it also gave strong orange dyeing on both gray and bleached hair from the peroxide bath, equal to the above dyeing applied without peroxide.

EXAMPLE 90

The product of Example 17 was dyed according to Procedure A, using 0.1 g. dye, 4.0 g. triethanolamine (alkali), 0.75 g. sodium N-methyl-N-oleoyltaurate (surfactant) and 3.0 g. sodium carboxymethylcellulose, and adjusting the pH to 10. A heavy red shade on both kinds of hair was obtained which was slightly reduced after 3 shampooings. The dye composition was stable on storage at 50° C. for 3 months; thereafter it dyed hair in the same shade and strength as initially.

When Procedure A was followed using 0.1 g. of the same dye, 0.2 g. triethanolamine (as alkali), 4.0 g. coconut monoethanolamide, and 4.0 g. polyethyleneoxy stearate as surfactants, and adjusting the pH to 7.9, a red shade again was obtained, slightly weaker than the above shade, but remarkably level, and about equal on both kinds of hair.

By following Procedure B, and using 0.1 g. of the same dye, 1.0 g. isooctylphenyl polyethoxy ethanol, and no thickening agent, and adjusting the pH to 5.5 by addition of acetic acid, there was again obtained a strong red dyeing, somewhat stronger on bleached than on gray hair, and fast to shampooing and rubbing.

Procedure C was followed with 0.1 g. of the same dye and gave a red dyeing somewhat weaker than the dyeing mentioned in the first paragraph, but still moderately strong and uniform on both kinds of hair.

EXAMPLE 91

The dye product of Example 24 was dyed according to Procedure A: 0.2 g. dye was combined with 3 g. ethanolamine (alkali), 3 g. sodium N-coconut acid N-methyl taurate (surfactant) and 2 g. methylcellulose, at pH 8.5. The dyeings were strong reds on both gray and bleached hair, fast to shampooing and rubbing. When, by Procedure A, 0.2 g. dye was combined with 4 g. 3,3'-iminodipropylamine, 2 g. sodium lauryl sulfate and 3 g. methylcellulose at pH 9.5, very similar dyeing were obtained. Again, by Procedure A, for 0.2 g. dye, using 9 g. 28% ammonia as the alkaline agent, 20 g. oleic acid, 1 g. sodium lauryl sulfate and 3 g. polyethoxylated nonylphenol as the surfactants, at pH 9.5, the dyeings were somewhat weaker than the preceding dyeings, but still strong reds on both kinds of hair.

The same dye was applied by Procedure B, in the following compositions: (a) 0.25 g. dye polyethoxylated nonylphenol, 3 g. methylcellulose, and sulfuric acid added to pH 5; (b) 0.25 g. dye, 0.5 g. ethyleneglycol monostearate, 2 g. dicoco dimethyl ammonium chloride, 1 g. cetyl stearyl alcohol, and citric acid added to pH 7. Red dyeings were obtained in both kinds of hair, of some shade, and almost as strong, as the first dyeing above obtained by Procedure A. The dyeings were fast to shampooing and rubbing.

The same dye (0.25 g.) was also applied by Procedure C, and in spite of the presence of peroxide gave strong red dyeings of gray and bleached hair.

EXAMPLE 92

The dye product of Example 32 was dyed by Procedure A, using 0.25 g. dye, 2.0 g. N-phenyldiethanolamine (alkali), 3.0 g. coconut diethanolamide (surfactant) and 1.0 g. co-polymer of acrylic acid and allylsucrose (thickener), the pH being set at 9.0. The color on hair was bluish violet, the affinity being high on gray hair and very high on bleached. Shampoo fastness was excellent. The dye bath stored at 50° C., for 3 months, gave no change in shade and strength of dyeing thereafter.

The same dye by Procedure B, using 0.25 g. dye, 2.0 g. ethyleneglycol monostearate (surfactant) and ammonium sulfate added to give a pH of 5.0, gave a strong bluish violet dyeing of bleached hair, somewhat weaker on gray hair, both dyeings being fast to shampooing and rubbing.

When Procedure B was followed using 0.25 g. dye and 2.0 g. distearyl dimethyl ammonium chloride and 1.5 g. cetyl-stearyl alcohol as surfactants, with no thickener, the pH being adjusted to 7 by means of critic acid, there was obtained a strong dyeing of the bleached hair in bluish violet shade; the gray hair was dyed a weaker but level shade of bluish violet, both dyeings being fast to shampooing and rubbing.

EXAMPLE 93

The dye product of Example 41 was applied to hair by Procedure A, using 0.15 g. dye, 3.5 g. 1,3-diaminopropane (as alkaline agent), 1.0 g. sodium lignosulfonate (surfactant), and 3.0 g. hydroxyethylcellulose (thickener) and setting the pH at 8.0. Both gray and bleached hair were dyed equally strong shades of orange, very fast to successive shampooings. The dye bath was stable on 3 months storage at 50° C.

By Procedure B, this dye, 0.2 g., with 2.0 g. polyethoxylated octyl phenol and 2.0 g. hydroxyethylcellulose at a pH of 6.5 effected by addition of formic acid, gave equal uniform orange dyeings of the two kinds of hair fast to shampooing.

EXAMPLE 94

The product of Example 50 was dyed by Procedure A using 0.1 g. dye, 2.0 g. 3,3'-imino-dipropylamine (as alkaline agent), 3.0 g. mixed fatty acids diethanolamide (as surfactant), and 2.0 g. sodium alginate (as thickener), the pH being adjusted to 9.0. The gray and bleached hair were both dyed a similar, level red shade of good strength, which was fast to successive shampoos. The dye compositions remained unchanged after three months storage at 50° C., after which time it dyed hair in the same shade and strength as initially.

Procedure A was again followed with this dye, using 0.1 g. dye, 1.5 g. diethylenetriamine (alkaline agent), 2.0 g. N-lauryl myristyl beta-aminopropionic acid (surfactant), and 1.0 g. methylcellulose, at a pH of 8.0. The dyeings were similar to those above.

In a third dyeing by Procedure A, 0.1 g. of the same dye, was combined with 2.5 g. morpholine (alkaline agent), 2.0 g. dodecylbenzenesulfonate (surfactant) and 1.0 g. copolymer of acrylic acid and allylsucrose (thickener) at a pH of 9.5. The dyeings were similar to those above.

EXAMPLE 95

The dye product of Example 61 was applied to hair by Procedure A, using 0.2 g. dye, 1.5 g. ethylenediamine (alkaline agent), 0.75 g. sodium lauryl sulfate (surfactant), and 2.5 g. sodium carboxymethylcellulose, at a pH of 9.5. A strong level orange dyeing was obtained on both kinds of hair, fast to shampooing and rubbing.

When dyed by Procedure B, with 0.2 g. dye, 3.0 g. cetylpyridinium bromide (surfactant), 1.5 g. methylcellulose and tartaric acid added to pH 6.5, the dyeings were slightly stronger than the above dyeings, but equally level and uniform as between the two kinds of hair.

The same dye was applied by Procedure C in which case it gave strong level dyeings. The shade and strength were the same as when the dye was applied without the use of hydrogen peroxide, substituting an equal volume of water.

EXAMPLE 96

The product of Example 62 was dyed variously according to Procedure A, using 0.25 g. dye. In one case the alkaline agent was 0.5 g. triethanolamine, the surfactant was 2.0 g. sodium N-oleoyl-N-methyltaurate, and the thickening agent was 3.0 g. sodium carboxymethylcellulose, the pH being adjusted to 7.5. In another case there was used 2.0 g. N-phenyldiethanolamine, 2.5 g polyoxyethylene lauric ester, and 3.0 g. sodium carboxymethylcellulose; and the pH was 8.5. In both cases very similar red dyeings were obtained, of about the same shade and strength on the two kinds of hair, and fast to shampooing.

EXAMPLE 97

The dye product of Example 74 was applied to hair by Procedure A using 0.15 g. dye, 3.0 g. diisopropanolamine, 3.0 g. lauric diethanolamide, and 3.0 g. methylcellulose, at pH 8.5. An excellent maroon dyeing was obtained of high strength and levelness, fast to three successive shampooings. When in this procedure there was used 2.0 g. 1,3-diaminopropane, 3.0 g. glyceryl stearate and 3.0 g. methylcellulose, at pH 9.0, the dyeings were essentially similar in shade, strength and fastness. When the above dye compositions were stored at 50° C. for 3 months and then dyed on hair again, the dyeings were similar to the initial dyeings in shade and strength.

The dye was also applied by Procedure B using 0.15 g. dye, 2.0 g. ethylene glycol monostearate, and lactic acid added to give pH 5.0. The bleached hair was dyed strongly maroon, the gray hair being dyed a similar but weaker shade. The same procedure was followed using the following ingredients: 1.0 g. polyethoxylated coconut fatty acid amide, 3.0 g. di-coco dimethyl ammonium chloride, 2.0 g. hydroxyethylcellulose, and citric acid to give pH 6.5. Moderately strong maroon dyeings were obtained, with the bleached hair being dyed stronger than the gray.

EXAMPLE 98

The product of Example 76 was dyed on hair by Procedure A, using 0.2 g. dye and the following adjuvants: 2.5 g. diethylenetriamine, 2.0 g. polyoxyethylene lauric ester and 3.0 g. gum arabic; the pH was adjusted to 8.5. The hair was colored strongly violet, similarly on gray as on bleached hair, and the shampoo fastness was very good. Also as strong a violet dyeing was obtained by using the following adjuvants: 3.0 g. ethanolamine, 3.0 g. coconut fatty acid diethanolamide, and 3.0 g. sodium carboxylmethylcellulose, at pH 8.5. Somewhat weaker violet dyeings, but still very level and fast to shampooing, were obtained with the following: 3.0 g. triisopropanolamine, 3.0 g. coconut fatty acid diethanolamide and 3.0 g. sodium carboxymethylcellulose, at pH 8.0.

The same dye was also applied by Procedure B using: 0.2 g. dye, 1.5 g. glycerol monooleate and acetic acid added to give a pH of 5.5. A similar shade of violet was obtained which was particularly strong on the bleached hair.

EXAMPLE 99

The dye product of Example 81 was applied by Procedure A using 0.15 g. dye and several combinations of adjuvants, as follows:

(1) 3.0 g. 1,3-diaminopropane, 2.0 g. sodium N-coconut-N-methyl taurate, with no thickener; pH 9.0;

(2) 2.0 g. N-phenyldiethanolamine, 1.5 g. sodium lignosulfonate, and 2.0 g. hydroxyethylcellulose; pH 8.0;

(3) 3.0 g. ethanolamine, 1.5 g. sodium lignosulfonate, and 2.0 g. hydroxyethylcellulose; pH 8.5; and (4) 0.25 g. triisopropanolamine, 4.0 g. coconut acid ethanolamide, 2.0 g. coconut acid diethanolamide, 3.0 g. coco amine crotonic acid condensate; pH 7.5.

The dyeings were all strong level maroon shades, similar in shade and strength on both kinds of hair. The dyeings (1) above were particularly heavy, as compared to (2), (3) and (4) which were all essentially alike.

The same dye was also applied by Procedure B using 0.15 g. dye combined with the following:

(1) 2.0 g. octylphenol polyethylene oxide condensate; with no thickener, citric acid to pH 5;

(2) 1.0 g. glycerol monostearate, 3.0 g. dodecyl benzyl dimethyl ammonium chloride; ammonium sulfate added pH 6.5.

The dyeing were level maroons, similar on both kinds of hair. Dyeing (1) were heavier than dyeings (2), but both were strong.

EXAMPLE 100

The product of Example 82 was dyed on hair by Procedure A, using 0.15 g. dye and the following combinations of adjuvants:

(1) 3.0 g. diethylenetriamine, 1.0 g. sodium dodecylbenzenesulfonate, 2.0 g. hydroxyethylcellulose; pH 9.5;

(2) 4.0 g. isopropanolamine, 3.0 g. nonylphenol polyoxyethylene condensate, 2.0 g. sodium carboxymethylcellulose; pH 8.5.

The dyeing were a purple shade of very good strength, which were fast to three successive shampooings.

The same dye was applied by Procedure B using 0.15 g. dye, combined with the following:

(1) 1.5 g. polyoxyethylene monostearate, 2.0 g. hydroxyethylcellulose, lactic acid added to pH 6.5;

(2) 2.0 g. cetyl pyridinium bromide, 1.5 g. polyoxyethylated fatty alcohol, citric acid to pH 7.

The dyeings were in moderately strong purple shades, fast to shampooing and rubbing.

The same dye was also applied by Procedure C and gave moderately strong purple dyeings. The dye was shown to be completely stable in the peroxide composition, since when it was dyed by Procedure C but without peroxide (substituting an equal volume of water), it gave the same shade and strength as when dyed with peroxide.

The following additional dyeings, performed according to Procedure A, are listed in Table I, wherein the various columns designate the dye, the alkaline agent, the surfactant, and the thickening agent, together with the amount of each component used, the final pH of the composition, the color produced on gray and bleached hair, and any especially noteworthy characteristics of the composition or dyeings.

TABLE I

| Dye product of Ex. | Amount of dye, g. | Alkaline agent | Surfactant | Thickening agent | pH | Color on hair | Comments |
|---|---|---|---|---|---|---|---|
| 4 | 0.3 | 5 g. triethylenetetramine | 0.5 g. sodium lauryl sulfate | 2 g. methylcellulose | 9.5 | Bluish violet | |
| 4 | 0.5 | ....do | ....do | ....do | 9.5 | ....do | |
| 6 | 0.05 | 2 g. diethanolamine | 1 g. polyethoxylated nonylphenol | 1 g. acrylic acid allyl-sucrose copolymer | 9.80 | Orange | Fast to 3 shampoos. |
| 7 | 0.25 | 3 g. N-phenyldiethanolamine | 4 g. coconut acid diethanolamide | 3 g. sodium carboxymethylcellulose | 9.0 | Red | |
| 7 | 0.5 | ....do | ....do | ....do | 9.0 | Red | |
| 9 | 0.1 | 1 g. 1,2-diaminopropane | 0.5 g. sodium lignosulfonate | None | 8.0 | Violet | |
| 11 | 0.1 | 1 g. triethylamine | 2 g. lauric diethanolamide | 2 g. methylcellulose | 8.5 | Red | Dye bath stable on storage. |
| 12 | 0.2 | 4 g. triethanolamine | 3 g. sodium N-oleoyl-N-methyl taurate | 3 g. sodium carboxymethylcellulose | 9.5 | Bluish violet | |
| 13 | 0.2 | ....do | 0.5 g. sodium dioctyl sulfosuccinate | 2 g. sodium carboxymethylcellulose | 9.5 | ....do | |
| 15 | 0.3 | 4 g. 3,3'-iminodipropylamine | 1 g. ethylene glycol monostearate | 3 g. hydroxyethylcellulose | 8.5 | ....do | |
| 15 | 0.75 | ....do | ....do | ....do | 8.5 | ....do | |
| 18 | 0.15 | 2 g. morpholine | 3 g. polyethoxylated coconut fatty acid amide | 3 g. methylcellulose | 9.5 | ....do | Fast to 3 shampoos |
| 18 | 0.2 | 0.5 g. isopropanolamine | 2.5 g. coco amine crotonic acid condensate, 3.0 g. coconut acid diethanolamide | None | 7.5 | ....do | |
| 19 | 0.1 | 2 g. ethylenediamine | 2.5 g. sodium lauryl sulfate | 2 g. sodium alginate | 8.5 | Orange | Dye bath stable on storage. |
| 21 | 0.1 | 2 g. diethylenetriamine | 1.5 g. glyceryl sterarate | 2 g. methylcellulose | 8.0 | Red | Fast to 3 shampoos. |
| 25 | 0.25 | 3 g. 1,3-diaminopropane | 2 g. sodium lignosulfonate | 3 g. sodium carboxymethylcellulose | 8.5 | Red | |
| 27 | 0.25 | 3 g. triethylenetetramine | 3 g. nonylphenoxy poly (ethyleneoxy)ethanol | ....do | 9.0 | Purple | |
| 29 | 0.25 | 2 g. 3,3'-imino-dipropylamine | 2 g. sodium dodecylbenzenesulfonate | 3 g. methylcellulose | 8.5 | Red | |
| 31 | 0.25 | 2 g. triethanolamine | 3 g. sodium lauryl sulfate | ....do | 9.5 | Red | |
| 31 | 0.75 | ....do | ....do | ....do | 9.5 | Red | |
| 33 | 0.3 | 3 g. 1,3-diaminopropane | 2.5 g. sodium N-methyl-N-palmitoyl taurate | 3 g. hydroxyethylcellulose | 8.5 | Orange | |
| 35 | 0.25 | 4 g. triethanolamine | 3 g. polyoxyethylene lauric | ....do | 9.5 | Red | |

TABLE I.—Continued

| Dye product of Ex. | Amount of dye, g. | Alkaline agent | Surfactant | Thickening agent | pH | Color on hair | Comments |
|---|---|---|---|---|---|---|---|
| 37 | 0.2 | 3 g. N-phenyldiethanolamine. | 3 g. sodium myristyl sulfate. | 2.5 g. sodium carboxymethylcellusloe. | 9.5 | Violet | |
| 39 | 0.15 | 2.5 g. N-phenyldiethanolamine. | 3 g. lauric diethanolamide | 2 g. methylcellulose. | 8.5 | Red | Dic bath stable on storage. |
| 39 | 0.2 | 0.25 g. triisopropanolamine | 4 g. polyoxyethylene monostearate, 2 g. coconut acid monoethanolamide, 2 g. coconut acid diethanolamide. | None | 7.0 | Red | |
| 40 | 0.2 | 2 g. isopropanolamine | 2 g. sodium lignosulfonate | 3 g. sodium carboxymethylcellulose. | 8.5 | Bluish violet | |
| 42 | 0.25 | 2 g. ethanolamine | 3 g. glyceryl stearate | 1 g. copolymer of acrylic acid and allylsucrose. | 8.5 | Purple | |
| 43 | 0.25 | 3 g. N-phenyltriethanolamine. | 3.5 g. sodium nonylnapthalenesulfonate. | 3 g. hydroxyethylcellulose. | 9.0 | Bluish violet. | |
| 45 | 0.3 | 4 g. isopropanolamine | 4 g. lauric diethanolamide | do | 10.0 | Red | |
| 47 | 0.2 | 3 g. ethylenediamine | 2 g. sodium lauryl sulfate | do | 9.0 | Red | |
| 48 | 0.1 | do | do | do | 9.0 | Bluish violet. | |
| 51 | 0.25 | 3 g. diethylenediamine | 3 g. nonylphenoxypoly(ethyleneoxy)ethanol | do | 9.5 | do | |
| 52 | 0.15 | 2 g. N-phenyldiethanolamine. | 2 g. polyethoxylated coconut acid amine. | do | 9.0 | Orange | |
| 54 | 0.2 | 3 g. triethanolamine | 2 g. sodium lauryl sulfate | 3 g. sodium carboxymethylcellulose. | 9.0 | Red | |
| 56 | 0.2 | do | do | do | 9.0 | Red | |
| 58 | 0.2 | do | do | do | 9.0 | Red | |
| 63 | 0.25 | 3 g. N-phenyldiethanolamine. | 3 g. polyethoxylated octyl phenol. | do | 9.0 | Bluish violet. | |
| 65 | 0.25 | 4 g. isopropanolamine | 2.5 g. sodium N-coconut acid N-methyl taurate. | 3 g. hydroxyethylcellulose. | 9.5 | Red | |
| 67 | 0.25 | do | do | do | 9.5 | Red | |
| 69 | 0.25 | 3 g. N-phenyldiethanolamine. | 3 g. polyethoxylated octyl phenol. | 3 g. sodium carboxymetnylcullulose. | 9.0 | Red | |
| 71 | 0.25 | do | do | do | 9.0 | Red | |
| 73 | 0.25 | 3 g. triethanolamine | 2.5 g. sodium lauryl sulfate | do | 9.0 | Red | |
| 75 | 0.2 | 2 g. 1,3-diaminopropane | 1.5 g. sodium lignosulfonate | do | 8.0 | Violet | |
| 77 | 0.2 | 3 g. N-phenyldiethanolamine. | 2.5 g. sodium lauryl sulfate | do | 9.0 | do | |
| 78 | 0.2 | do | do | do | 9.0 | do | |
| 79 | 0.25 | 3 g. 3,3'-imino-dipropyl amine. | 3 g. sodium lauryl sulfate | do | 9.0 | Reddish brown. | Fast to 3 shampoos. |
| 80 | 0.25 | do | do | do | 9.0 | Purple | Do. |
| 83 | 0.25 | 1.5 g. isopropanolamine | 2.5 g. sodium dodecylbenzenesulfonate. | 3 g. methylcellulose | 8.0 | Violet | |
| 84 | 0.25 | 3 g. N-phenyldiethanolamine. | 3 g. sodium N-methyl-N-oleoyl taurate. | 3 g. sodium carboxymethylcellulose. | 9.0 | Bluish red | Dye bath stable storage. |
| 85 | 0.25 | 1.5 g. isopropanolamine | 2.5 g. sodium dodecylbenzenesulfonate. | 3 g. methylcellulose | 8.0 | Violet | |

The following additional dyeings, performed according to Procedure B, are listed in Table II, wherein the various columns designate the dye, the acid agent, the surfactant and the thickening agent; together with the amount of each component used, the final pH of the composition and the color produced on gray and bleached hair.

TABLE II

| Dye, product of Ex. | Amount of dye, g. | Acid agent | Surfactant | Thickening agent | pH | Color on hair |
|---|---|---|---|---|---|---|
| 4 | 0.25 | Citric acid | 2 g. glyceryl stearate | 3 g. methylcellulose | 5 | Bluish violet. |
| 6 | 0.25 | Sulfuric acid | 2 g. polyoxyethylene lauric ester | do | 4 | Orange. |
| 6 | 0.25 | Citric acid | 3 g. distearyl dimethyl ammonium chloride, 0.5 g. polyoxyethylated fatty alcohol, 1 g. glyceryl stearate. | | 7 | Do. |
| 7 | 0.2 | Lactic acid | 3 g. polyethoxylated coconut fatty amide | 2.5 g. methylcellulose | 5.5 | Red. |
| 9 | 0.2 | do | 2,5 g. cetyl pyridinium bromide | 3 g. hydroxyethylcellulose | 5 | Violet. |
| 11 | 0.25 | Acetic acid | 4 g. coconut fatty acid diethanolamide | 3 g. methylcellulose | 4.5 | Red. |
| 11 | 0.2 | Citric acid | 2 g. stearyl dimethyl benzyl ammonium chloride, 2 g. cetyl stearyl alcohol. | | 6.5 | Red. |
| 12 | 0.2 | do | 3 g. nonylphenoxypoly(ethyleneoxy) ethanol | 2 g. hydroxyethylcellulose | 5 | Bluish violet. |
| 13 | 0.2 | do | do | do | 5 | Do. |
| 15 | 0.3 | Formic acid | 2.5 g. cetylpyridinium bromide | 3 g. hydroxyethylcellulose | 6.5 | Do. |
| 15 | 0.5 | Formic acid | 2.5 g. cetylpyridinium bromide | 3 g. hydroxyethylcellulose | 6.5 | Bluish violet. |
| 18 | 0.25 | Ammonium sulfate. | 3 g. nonylphenoxypoly(ethyleneoxy)ethanol | 2.5 g. methylcellulose | 5.5 | Do. |
| 18 | 0.75 | do | do | do | 5.5 | Do. |
| 19 | 0.15 | Citric acid | do | do | 4 | Orange. |
| 19 | 0.15 | Tartaric acid | 1 g. polyoxyethylene lauric ester, 2.5 g. cetyl pyridinium bromide. | | 6.5 | Do. |
| 21 | 0.2 | Acetic acid | 2.5 g. ethyleneglycol monostearate | 3 g. methylcellulose | 5 | Red. |
| 25 | 0.2 | Citric acid | 2.5 g. cetylpyridinium bromide | 2.5 g. hydroxyethylcellulose | 5 | Red. |
| 27 | 0.2 | do | do | do | 6.5 | Bluish red. |
| 29 | 0.2 | Formic acid | 3 g. polyoxyethylene lauric ester | do | 5 | Red. |
| 31 | 0.2 | Citric acid | 3 g. lauric diethanolamide | do | 5 | Red. |
| 33 | 0.25 | do | 3 g. N-lauryl myristyl beta aminopropionic acid | 2.5 g. methylcellulose | 5 | Orange. |
| 33 | 0.75 | do | do | do | 5 | Do. |
| 35 | 0.25 | do | 2.5 g. glyceryl stearate | do | 5 | Red. |
| 37 | 0.2 | Tartaric acid | 3 g. polyethoxylated octyl phenol | do | 5.5 | Violet. |
| 39 | 0.15 | Lactic acid | 3 g. nonylphenoxypoly(ethyleneoxy)ethanol | do | 4.5 | Red. |

TABLE II.—Continued

| Dye, product of Ex. | Amount of dye, g. | Acid agent | Surfactant | Thickening agent | pH | Color on hair |
|---|---|---|---|---|---|---|
| 39 | 0.15 | Citric acid | 1 g. glyceryl stearate, 3 g. distearyl dimethyl ammonium chloride. | 3 g. methyl cellulose | 6.5 | Red. |
| 40 | 0.2 | do | 3 g. nonylphenoxy poly(ethyleneoxy) ethanol | 2 g. hydroxyethyl cellulose | 6 | Bluish violet. |
| 42 | 0.2 | do | do | 3 g. hydroxyethyl cellulose | 5 | Violet. |
| 43 | 0.2 | Lactic acid | do | do | 5 | Bluish violet. |
| 45 | 0.3 | Ammonium sulfate. | do | do | 6.5 | Red. |
| 45 | 0.50 | do | do | do | 6.5 | Red. |
| 47 | 0.2 | Citric acid | 3 g. N-lauryl myristyl beta aminopropionic acid | 3 g. methylcellulose | 3.5 | Red. |
| 48 | 0.2 | do | 3 g. nonylphenoxy poly(ethyleneoxy) ethanol | do | 6 | Bluish violet. |
| 51 | 0.2 | do | do | do | 5 | Do. |
| 52 | 0.2 | Acetic acid | 2.5 g. distearyl dimethyl ammonium chloride | do | 5.5 | Orange. |
| 54 | 0.2 | Citric acid | 3 g. polyethoxylated nonylphenol | 3 g. hydroxyethylcellulose | 7 | Red. |
| 56 | 0.2 | do | do | do | 5 | Red. |
| 58 | 0.2 | do | 2 g. ethylene glycol monostearate | 3 g. methylcellulose | 6 | Red. |
| 63 | 0.25 | Lactic acid | 2 g. glyceryl stearate | 2.5 g. hydroxyethylcellulose | 5 | Bluish violet. |
| 65 | 0.25 | Citric acid | 3 g. polyethoxylated nonylphenol | 3 g. methylcellulose | 5.5 | Red. |
| 67 | 0.25 | do | do | do | 5 | Red. |
| 69 | 0.25 | do | do | do | 5 | Red. |
| 71 | 0.25 | do | do | do | 6.5 | Red. |
| 73 | 0.25 | do | do | do | 5 | Red. |
| 75 | 0.2 | do | 4 g. coconut acid diethanolamide | 2 g. hydroxyethylcellulose | 5 | Violet. |
| 77 | 0.2 | Formic acid | 2.5 g. distearyl dimethyl ammonium chloride | do | 5.5 | Do. |
| 78 | 0.2 | Citric acid | 2 g. glyceryl stearate | 3 g. methylcellulose | 5.5 | Do. |
| 79 | 0.2 | do | do | do | 6.0 | Reddish brown. |
| 80 | 0.2 | do | 3 g. polyethoxylated nonylphenol | do | 5 | Purple. |
| 83 | 0.2 | do | 2.5 g. dodecyl benzyl dimethyl ammonium chloride | do | 5 | Violet. |
| 84 | 0.15 | do | 4 g. coconut acid diethanolamide | do | 4.5 | Purple. |
| 84 | 0.15 | do | 3 g. polyethoxylated octylphenol, 2 g. cetyl pyridinium bromide 1.5 g. cetyl stearyl alcohol. | do | 6.5 | Do. |
| 85 | 0.2 | Acetic acid | 3 g. polyethoxylated nonylphenol | 3 g. methylcellulose | 5 | Violet. |

Although the invention has been described with reference to specific forms thereof, it will be understood that many changes and modifications may be made without departing from the spirit of this invention.

What is claimed is:

1. A compound of the formula:

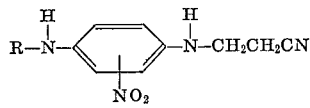

wherein R is a member of the group consisting of hydrogen or

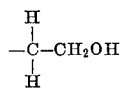

2. A compound of the formula:

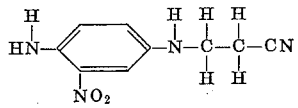

3. A compound of the formula:

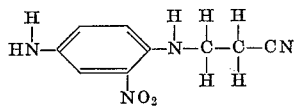

4. A compound of the formula:

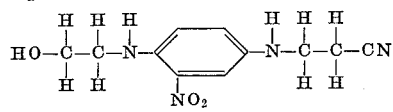

5. A compound of the formula:

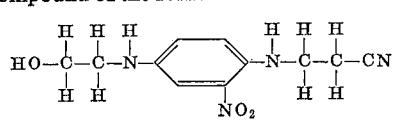

6. A compound of formula:

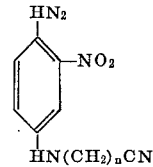

wherein $n$ is a whole number from 1 to 4.

7. A compound of formula:

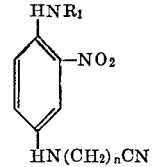

wherein $n$ is a whole number from 1 to 4, and $R_1$ is alkyl.

8. A compound of formula:

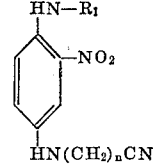

wherein $n$ is a whole number from 1 to 4, and $R_1$ is hydroxyalkyl.

9. A compound of formula:

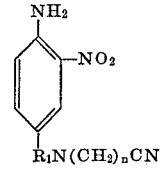

wherein $n$ is a whole number from 1 to 4, and $R_1$ is hydroxyalkyl.

10. A compound of formula:

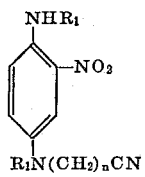

wherein $n$ is a whole number from 1 to 4, $R_1$ is hydroxyalkyl and $R_2$ is alkyl.

11. A compound of formula:

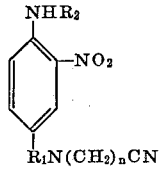

wherein $n$ is a whole number from 1 to 4, and wherein $R_1$ and $R_2$ are hydroxyalkyl.

12. A compound of formula:

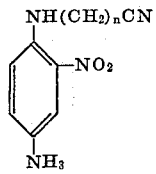

wherein $n$ is a whole number from 1 to 4.

13. A compound of formula:

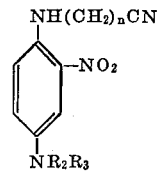

wherein $n$ is a whole number from 1 to 4, and wherein $R_2$ and $R_3$ are hydroxyalkyl.

14. N-$^1$(2-hydroxyethyl)-N-$^4$(2 Cyanoethyl)-2-nitro-p-phenylenediamine.

No references cited.

CHARLES B. PARKER, Primary Examiner

H. TORRENCE, Assistant Examiner

U.S. Cl. X.R.

8—10, 10.1, 10.2, 11; 260—471 C, 510, 518 R, 552 R, 553 A, 556 A, 556 AR, 558 A, 558 R, 562 R, 567.6 M, 570.5 P, 573, 575, 577, 578; 424—304